US007790272B2

(12) United States Patent
Osada et al.

(10) Patent No.: US 7,790,272 B2
(45) Date of Patent: Sep. 7, 2010

(54) MULTILAYER FILM AND BIAXIALLY ORIENTED POLYESTER FILM

(75) Inventors: Syunichi Osada, Otsu (JP); Chie Makiyama, Otsu (JP); Hirofumi Hosokawa, Hachioji (JP); Tetsuya Tsunekawa, Otsu (JP)

(73) Assignee: Toray Industries, Inc., Tokyo (JP)

( * ) Notice: Subject to any disclaimer, the term of this patent is extended or adjusted under 35 U.S.C. 154(b) by 267 days.

(21) Appl. No.: 10/559,126

(22) PCT Filed: Jun. 2, 2004

(86) PCT No.: PCT/JP2004/007599

§ 371 (c)(1), (2), (4) Date: May 3, 2006

(87) PCT Pub. No.: WO2004/108408

PCT Pub. Date: Dec. 16, 2004

(65) Prior Publication Data

US 2007/0026223 A1 Feb. 1, 2007

(30) Foreign Application Priority Data

Jun. 4, 2003 (JP) ............................ 2003-159030
Sep. 5, 2003 (JP) ............................ 2003-313569

(51) Int. Cl.
*B32B 7/00* (2006.01)

(52) U.S. Cl. ....................... 428/212; 428/213; 428/220; 428/332; 428/480; 428/910

(58) Field of Classification Search ................. 428/212, 428/213, 220, 332, 480, 910
See application file for complete search history.

(56) References Cited

U.S. PATENT DOCUMENTS 4,162,343 A * 7/1979 Wilcox et al. ............... 428/212
4,310,584 A * 1/1982 Cooper et al. ............... 428/212
4,797,308 A * 1/1989 Mattin ......................... 428/15
5,089,318 A * 2/1992 Shetty et al. ................ 428/212
5,112,906 A * 5/1992 Ogata et al. ................... 525/61
5,122,905 A * 6/1992 Wheatley et al. ............ 359/586
5,126,880 A * 6/1992 Wheatley et al. ............ 359/587
5,234,729 A * 8/1993 Wheatley et al. .............. 428/30
5,262,894 A * 11/1993 Wheatley et al. ............ 359/586
5,278,694 A * 1/1994 Wheatley et al. ............ 359/359
5,451,449 A * 9/1995 Shetty et al. ............. 428/195.1
5,731,071 A * 3/1998 Etchu et al. ................. 428/220
6,268,961 B1 * 7/2001 Nevitt et al. ................ 359/488
6,475,608 B2 * 11/2002 Allen et al. ................. 428/212
6,602,585 B2 * 8/2003 Graney ....................... 428/212

* cited by examiner

*Primary Examiner*—David R Sample
*Assistant Examiner*—Lawrence D Ferguson
(74) *Attorney, Agent, or Firm*—Kubovcik & Kubovcik

(57) ABSTRACT

An objective of the present invention is to provide a film that has a high rigidity and is superior in dimension stability under high temperatures and transparency after heating processes, as well as in moldability within a wide temperature range, which has not been achieved by conventional techniques, and this objective has been achieved by a laminated film that includes 50 or more layers each of which is made of a thermoplastic resin and has a thickness of less than 30 nm or a biaxial oriented polyester film that has a density in a range from 1 to 1.4 $g/cm^3$, a heat shrinkage of −2 to 2% in the longitudinal direction at 180° C. and a breaking elongation in a range of 100 to 1000% in at least one direction.

22 Claims, 1 Drawing Sheet

MULTILAYER FILM AND BIAXIALLY ORIENTED POLYESTER FILM

Figure 1:
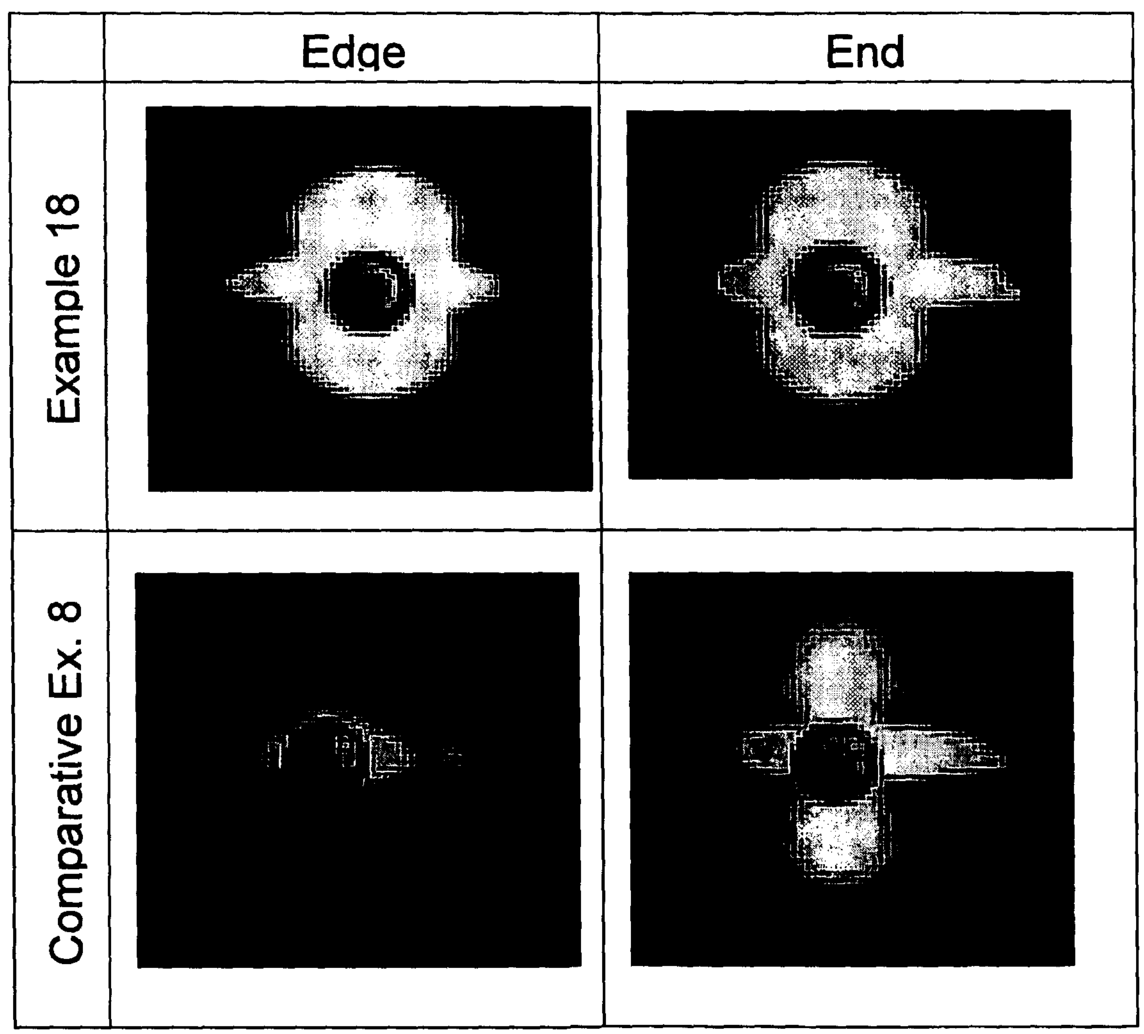

This application is a 371 of international application PCT/JP2004/007599, which claims priority based on Japanese patent application Nos. 2003-159030 and 2003-313569 filed Jun. 4 and Sep. 5, 2003, respectively, which are incorporated herein by reference.

TECHNICAL FIELD

This invention relates to a laminated film and a biaxial oriented polyester film.

BACKGROUND ART

Thermoplastic resin films have been widely used as packaging materials and as other materials such as various industrial materials including label, graphic, OHP, mold-releasing, ink ribbon, electric insulator, heat-sensitive stencil sheet and stamping materials and magnetic materials including audio, video and data storage materials. In these applications, the film is generally used as a supporting member, and subjected to various surface treatments such as printing, vapor deposition, sputtering, plating, laminating and coating treatments. For this reason, from the view point of handling, the film to be used as the supporting member needs to have an appropriate rigidity. Moreover, in order to process the film with high precision even under high temperatures, it is essential for the film to exert a superior dimension stability under high temperatures.

In many cases, the film is molded through various methods, such as vacuum-molding, vacuum air-compression molding, plug assist vacuum air-compression molding, press molding and in-mold molding methods. In other words, the film is required to simultaneously achieve a high molding processability which appears to be impossible to provide simultaneously with the rigidity and dimension stability. In recent years, there have been strong demands for molded products which have more complicated and deeper shapes while maintaining a printed pattern with high precision and a glossy appearance, in a wide range of applications.

Patent Document 1 has disclosed a film that is superior in dimension stability under high temperatures as well as in moldability and surface processability. In recent years, however, in printing treatment processes and the like, films have been used under higher temperatures, raising a problem in that the conventional film is not applicable. Moreover, another problem is that, although the heat shrinkage in the width direction can be reduced in a film manufacturing process comparatively easily, it is difficult to reduce the heat shrinkage in the longitudinal direction.

Here, various films in which multiple thermoplastic resin layers are laminated have been proposed; for example, a product in which a laminated film with multiple layers that is superior in tearing resistance is bonded to a glass surface so that it becomes possible to effectively prevent glass from damages and scattering has been proposed (see Patent Document 2 and Patent Document 4), and a film in which resin layers having different indexes of refraction are alternately laminated into a multi-layered film so that specific wavelengths are selectively reflected has been proposed (see Patent Documents 5 to 9).

However, these films are insufficient in the dimension stability under high temperatures and tend to fail to provide a sufficient moldability.

[Patent Document 1] Japanese Patent Application Laid-Open No. 2003-11217

[Patent Document 2] U.S. Pat. No. 5,604,019

[Patent Document 3] Japanese Patent Application Laid-Open No. 10-76620

[Patent Document 4] Japanese Patent Application Laid-Open No. 3-41401

[Patent Document 5] Japanese Patent Application Laid-Open No. 4-295804

[Patent Document 6] PCT Application WO No. 95/17303

[Patent Document 7] Japanese Patent Application Laid-Open No. 11-188810

[Patent Document 8] Japanese Patent Application Laid-Open No. 2000-141567

[Patent Document 9] Japanese Patent Application Laid-Open No. 2000-329935

DISCLOSURE OF THE INVENTION

Problems to be Solved by the Invention

In order to solve the above-mentioned problems with the prior art techniques, the objective of the present invention is to provide a film that has a high rigidity and is superior in dimension stability under high temperatures, as well as in moldability within a wide temperature range.

Means To Solve The Problems

In order to achieve the above-mentioned objective, a laminated film of the present invention has the following structures:

(1) A laminated film that contains 50 or more layers each of which is made of a thermoplastic resin and has a thickness of less than 30 nm.

(2) The laminated film described in (1), which is made from at least two kinds of thermoplastic resins.

(3) The laminated film described in (1) or (2), which is a biaxially extended film.

(4) A biaxial oriented polyester film that has a density in a range from 1 to 1.4 g/cm$^3$, a heat shrinkage of −2 to 2% in the longitudinal direction at 180° C. and a breaking elongation in a range of 100 to 1000% in at least one direction.

(5) A laminated film made of the biaxial oriented polyester film of (4).

(6) The laminated film described in (4) or (5) in which 50 or more layers made from two kinds or more of thermoplastic resins are laminated in the thickness direction.

(7) The laminated film, described in any of (1) to (3) and (5) and (6), which is made from at least two kinds of crystalline resins having different crystal structures.

(8) The laminated film described in any of (1) to (3) and (5) to (7) in which a periodic structure is contained in the layers.

(9) The laminated film described in any of (1) to (3) and (5) to (8) in which the thickness of each layer is set to 0.1 to 8 times the crystal size of the resin forming the layer.

(10) The laminated film, described in any of (1) to (3) and (5) to (9), which has two or more peaks, each having a heating value of crystal fusion of 8 J/g or more.

(11) The laminated film, described in any of (1) to (3) and (5) to (10) in which: the number of laminated layers is 1000 or more and the precision of lamination is 50% or less.

(12) The laminated film described in any of (1) to (3) and (5) to (11) in which the elongation percentage to stress characteristic at room temperature at least in one direction satisfies the following expression (1):

$$0.9 \leqq \sigma 2/\sigma 1 \leqq 1.2 \quad \text{expression (1)}$$

σ1: stress at 50% in elongation percentage (MPa)

σ2: stress at 100% in elongation percentage (MPa)

(13) The laminated film described in any of (1) to (3) and (5) to (12) in which the elongation percentage to stress characteristic at room temperature at least in one direction satisfies the following expressions (2) to (4):

$$\sigma 1 \leqq 120 \quad \text{expression (2)}$$

$$\sigma 2 \leqq 140 \quad \text{expression (3)}$$

$$\sigma 3 \leqq 110 \quad \text{expression (4)}$$

σ1: stress at 50% in elongation percentage (MPa)

σ2: stress at 100% in elongation percentage (MPa)

σ3: yield point stress (MPa)

(14) The laminated film described in any of (1) to (3) and (5) to (13) in which the average Young's modulus in the film longitudinal direction as well as in the film width direction is set in a range from 3 to 5 GPa.

(15) The laminated film, described in any of (1) to (3) and (5) to (14), which is a laminated film composed of 50 or more layers formed by layers made from a thermoplastic resin A and layers made from a thermoplastic resin B and in which an α relaxation temperature, obtained in dynamic viscoelasticity measurements, is observed between (a relaxation temperature of thermoplastic resin B+10)° C. and (α relaxation temperature of thermoplastic resin A−10)° C., with two or more melting points.

(16) The laminated film described in any of (1) to (3) and (5) to (15) in which the thermal expansion coefficient is set to 110 ppm or less.

(17) The laminated film described in any of (1) to (3) and (5) to (16) in which a raised haze value after a heating test is set to 15% or less.

(18) The laminated film described in any of (1) to (3) and (5) to (17) in which, upon measurements on X-ray small angle scattering, spot-shaped scattering is observed in the end direction and/or the edge direction.

(19) The laminated film described in any of (1) to (3) and (5) to (18) in which a difference (ΔTm) between the melting point and the cooling crystallization temperature of the thermoplastic resin A and/or the thermoplastic resin B is set to 60° C. or less.

(20) The laminated film described in any of (1) to (3) and (5) to (19) in which: a raised haze value after a heating test is set to 5% or less; the laminated film includes 500 or more layers formed by layers made from the thermoplastic resin A and layers made from the thermoplastic resin B; an α relaxation temperature, obtained in dynamic viscoelasticity measurements, is observed between (α relaxation temperature of thermoplastic resin B+10)° C. and (α relaxation temperature of thermoplastic resin A−10)° C.; and the elongation percentage to stress characteristic at room temperature at least in one direction satisfies the following expression (1):

$$0.9 \leqq \sigma 2/\sigma 1 \leqq 1.2 \quad \text{expression (1)}$$

σ1: stress at 50% in elongation percentage (MPa)

σ2: stress at 100% in elongation percentage (MPa)

(21) The laminated film described in any of (1) to (3) and (5) to (20) in which the film thickness is set to 1 μm or more to 600 μm or less.

(22) A molded body formed by using the laminated film described in any of (1) to (3) and (5) to (21).

(23) A transferring foil formed by using the laminated film described in any of (1) to (3) and (5) to (21).

(24) A lithium ion battery outer jacketing member formed by using the laminated film described in any of (1) to (3) and (5) to (21).

Effects Of The Invention

The laminated film of the present invention is prepared as a laminated film that features that 50 or more layers each of which is made from a thermoplastic resin and has a thickness of less than 30 nm are included; therefore, the laminated film has a high rigidity, and is superior in dimension stability under high temperatures as well as in moldability.

Moreover, the biaxial oriented polyester film in accordance with the present invention features that its density is set in a range from 1 to 1.4 g/cm$^3$, that its heat shrinkage in the longitudinal direction at 180° C. is set to −2 to 2% and that its breaking elongation in at least one direction is set in a range of 100 to 1000%; therefore, the laminated film has a high rigidity, and is superior in dimension stability under high temperatures as well as in moldability.

Furthermore, the laminated film, which is constituted by 50 or more layers formed by layers made from a thermoplastic resin A and layers made from a thermoplastic resin B and in which an α relaxation temperature, obtained in dynamic viscoelasticity measurements, is observed at least between (α relaxation temperature of thermoplastic resin B+10)° C. and (α relaxation temperature of thermoplastic resin A−10)° C., with two or more melting points; therefore, the resulting laminated film is further superior in transparency after a heating process.

Since the thermal expansion coefficient of the film is set to 110 ppm or less, the resulting film is superior in dimension stability under high temperatures and can be molded with high precision even under high temperatures.

Moreover, since a raised haze value after a heating test is set to 15% or less, the resulting laminated film becomes superior in transparency after a heating process, and when formed into a molded body, it becomes possible to provide a superior glossy appearance.

BEST MODE FOR CARRYING OUT THE INVENTION

The laminated film in accordance with the present invention is made from a thermoplastic resin, and includes 50 or more layers, each having a thickness of less than 30 nm. Preferably, it includes 500 or more layers, each having a thickness of less than 30 nm, more preferably, 1000 layers or more. In the case when the thickness is less than 30 nm, the size effects that contribute to a great increase in the interface volume, to a positional limitation in the order of several tens of molecules and several fine crystals and to an increased intermolecular correlation. For this reason, it becomes possible to control the fine structure in crystal portions as well as in amorphous portions, which has not been achieved by the conventional method, and consequently to remarkably improve the dimension stability under high temperatures, without impairing the inherent features of thermoplastic resins. Since 50 or more layers, each having a thickness of less than 30 nm, are laminated, the rate of portions in which fine-structure controlling operations are achieved and by which the film is occupied becomes sufficient so that the effects of the dimension stability under high temperatures and the superior moldability are easily exerted. Moreover, it becomes possible to reduce the possibility of a reduction in handling property due to the film thickness that is made too thin. In the case of installing 500 or more layers, the dimension stability under high temperatures is further improved. In the case of installing 1200 or more layers, the dimension stability under high temperatures and the moldability are further improved. Here, although not particularly limited, the upper limit value is preferably set to 50000 layers or less. The layer thickness is preferably set to less than 15 nm. In the case of the layer thickness of less than 15 nm, the dimension stability under high temperatures is further improved.

With respect to the thermoplastic resin in the present invention, examples thereof include: polyolefin resins such as polyethylene, polypropylene and polymethyl pentene; polyamide resins such as nylon 6 and nylon 66; polyester resins such as polyethylene terephthalate, polybutylene terephthalate, polypropylene terephthalate, polybutylene succinate and polyethylene-2,6-naphthalate; polycarbonate resins, polyacrylate resins, polyacetal resins, polyphenylene sulfide resins, acrylic resins, polyglycolic acid resins and polylactic acid resins. Among these, from the viewpoints of strength, heat resistance and transparency, in particular, polyester is preferably used.

The polyester, preferably used as the thermoplastic resin in the present invention, refers to a polycondensation material between a dicarboxylic acid component and a diol component. Examples of the dicarboxylic acid component include: terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenylsulfone dicarboxylic acid, adipic acid, sebacic acid, dimer acid and cyclohexane-dicarboxylic acid, and also include ester derivatives of these. With respect to the glycol component, examples thereof include: ethylene glycol, 1,3-propane diol, 1,2-propane diol, 1,3-butane diol, 1,4-butane diol, 1,5-pentadiol, diethylene glycol, polyalkylene glycol, 2,2-bis(4'-β-hydroxyethoxyphenyl)propane and 1,4-cyclohexane dimethanol. Among polyester resins, polyethylene-2,6-naphthalate and polyethylene terephthalate are preferably used, and polyethylene terephthalate is more preferably used. Moreover, these thermoplastic resins may be prepared as homoresins, or may be prepared as copolymer resins or blended resins of two or more kinds. Moreover, each of the layers may contain additives, such as an antioxidant, an antistatic agent, a crystal-core agent, inorganic particles, organic particles, a viscosity-reducing agent, a heat stabilizer, a lubricant, an infrared-ray absorbing agent and an ultraviolet-ray absorbing agent.

The laminated film of the present invention is preferably made from at least two kinds of thermoplastic resins. In the case when 50 or more layers, each having a thickness of less than 30 nm, are contained as in the case of the present invention, the structure composed of at least two kinds of thermoplastic resins prepares more areas in which interactions are mutually exerted between layers of different thermoplastic resins so that it becomes possible to further improve the dimension stability under high temperatures and the moldability.

The laminated film of the present invention is preferably biaxially extended. The biaxially extended film is allowed to have a high rigidity and superior dimension stability under high temperatures.

Moreover, a biaxial oriented polyester film, which relates to a second mode of the present invention, is essentially designed to have a density in a range from 1 to 1.4 g/cm$^3$. By setting the density in this range, both of superior dimension stability and moldability can be achieved. Here, when the laminated film is used as a molding material, the density exceeding 1.4 g/cm$^3$ tends to cause an increase in the total weight, resulting in problems. The density is more preferably set in a range from 1.2 to 1.39 g/cm$^3$, most preferably, from 1.3 to 1.39 g/cm$^3$.

In this case, it is important to allow the laminated film to have a heat shrinkage of −2 to 2% in the longitudinal direction at 180° C. This heat shrinkage in the longitudinal direction is a physical property that is difficult to reduce in a normal sequential biaxial extending method that is a general biaxial oriented polyester film molding method. When the heat shrinkage is set to −2 to 2% by using the method disclosed by the present invention or the like, the resulting film is allowed to exert superior characteristics in the application requiring thermal dimension stability under high temperatures. The heat shrinkage in the longitudinal direction at 180° C. is more preferably set in a range from −1 to 1.9%, most preferably, from −0.2 to 1.6%.

Moreover, in this case, it is important to allow the laminated film to have a breaking elongation in a range of 100 to 1000% in at least one direction. When the breaking elongation is less than 100%, a film tearing or the like tends to occur upon molding to cause a reduction in the yield and a difficulty in obtaining a desired molding material. Here, it is actually difficult to make the breaking elongation greater than 1000% because of the nature of polyester. The breaking elongation is more preferably set in a range from 200 to 600%, most preferably, from 220 to 400%. Moreover, the breaking elongation in the longitudinal direction or in the width direction is preferably set in a range from 100 to 1000%.

The biaxial oriented polyester film relating to the second mode of the present invention is preferably prepared as a laminated film. When the laminated film is used, the polyester film is allowed to easily achieve a high rigidity and high dimension stability. Moreover, the biaxial oriented polyester film relating to the second mode is preferably designed so that 50 or more layers made from two or more kinds of thermoplastic resins are laminated in the thickness direction. With this arrangement, it becomes possible to easily achieve dimension stability under high temperatures and good moldability. More preferably, 500 or more layers are laminated, and most preferably, 1200 or more layers are laminated. Here, from the view point of film-forming properties, the upper limit is preferably set to less than 500000 layers.

With respect to the lamination structure of the laminated film of the present invention, a structure in which layers mainly composed of thermoplastic resin A and layers mainly composed of thermoplastic resin B are regularly laminated in the thickness direction is preferably used. In other words, in the laminated film of the present invention, layers mainly composed of thermoplastic resin A and layers mainly composed of thermoplastic resin B are preferably laminated regularly in the thickness direction, and in particular, a structure in which these layers are alternately laminated is preferably used. Here, with respect to layers other than the layers mainly composed of thermoplastic resin A and the layers mainly composed of thermoplastic resin B, the order of the laminated layers is not particularly limited. In the case when layers composed of three kinds of resins, that is, thermoplastic resin A, thermoplastic resin B and thermoplastic resin C, are used, regular orders, such as A(BCA)n, A(BCBA)n and A(BABCBA)n, are preferably used to laminate the layers. In this case, n represents the unit number of repetitions, and for example, when n=3 in the case of A(BCA)n, the order of the laminated layers is indicated by ABCABCABCA in the thickness direction.

The film of the present invention is more preferably formed by at least two kinds of crystalline resins having different crystal structures. Here, the crystalline resin refers to a resin which, when evaluated by using an X-structure analyzing method, such as a wide angle X-ray diffraction meter, in an applied state, exhibits a crystal structure. Moreover, the expression "having different crystal structures" refers to a state in which, when evaluated by using an X-structure analyzing method such as a wide angle X-ray diffraction meter, different crystal lattice constants are obtained. In the case when two kinds of crystalline resins having mutually different crystal structures are contained, upon formation of layers, each having a thickness of less than 30 nm, that relates to the first mode of the present invention, a peculiar crystal formation is made in the layers as well as between the layers, it becomes possible to easily improve the dimension stability under high temperatures and the moldability. With respect to the crystalline resin of this type, examples thereof include: polyolefin resins such as polyethylene, polypropylene and polymethyl pentene; polyamide resins such as nylon 6 and nylon 66; polyester resins such as polyethylene terephthalate, polybutylene terephthalate, polypropylene terephthalate, polybutylene succinate and polyethylene-2,6-naphthalate; polyacetal resins, polyphenylene sulfide resins, polyglycolic acid resins and polylactic acid resins. Moreover, these thermoplastic resins may be prepared as homoresins, or may be prepared as copolymer resins or blended resins of two or more kinds.

In the present invention, when two kinds of crystalline resins A and B are used, the weight ratio of crystalline resin A to crystalline resin B is preferably set in a range from 20 wt % or more to 80 wt % or less, more preferably, from 35 wt % or more to 65 wt % or less. The weight ratio of less than 20 wt % tends to fail to sufficiently control one of the crystals, resulting in degradation in the effects of dimension stability under high temperatures. The weight ratio exceeding 80 wt % also causes the same problem.

In the film of the present invention, upon selecting crystalline thermoplastic resins as these thermoplastic resins A and B, the difference in melting points between the two is preferably set to 20° C. or more so as to obtain the effects of the present invention more easily. The difference is more preferably set to 15° C. or more, most preferably, to 20° C. or more. The melting point difference is preferably limited to 100 (more preferably, to 60, most preferably, to 50)° C. or less.

The laminated film of the present invention preferably contains a periodic structure in the constituent layers. For example, in the case of a laminated film composed of two kinds of crystalline resins A and B, periodic structures are included in both of the layers respectively constituted by crystalline resin A and crystalline resin B. The periodic structure of this type is observed by using an ultra-thin piece of the film under a transmission-type microscope with high magnification (10000 times to 500000 times) in combination with a dyeing technique. Here, the periodic structure in constituent layers refers to a state in which upon observation and image-capturing under a transmission-type electron microscope with high magnification, light and dark contrasts are alternately viewed in the layers of the resulting image. This is presumably because a periodic structure is formed as a result of regularly separated crystal portions and non-crystal portions. The regular, clear separation between the crystal portions and the non-crystal portions allows the crystal portions to function as joint points so that it becomes possible to provide higher dimension stability. Here, since the separated non-crystal portions are very low in the degree of order, the elongation property, which is essential for moldability, is effectively exerted.

The laminated film of the present invention is preferably designed so that the average thickness of the constituent layers is set to 0.1 to 8 times the crystal size of resins forming the respective layers. The average thickness is more preferably set in a range from 1 to 5 times. Here, the crystal size refers to the size that is obtained through measurements by a wide angle X-ray diffraction meter and calculations by using Scherrer's equation based upon a half-value width derived from 2θ/θ strength data of a face in the sectional direction. In this case, when peaks of crystalline resin A and crystalline resin B are overlapped with each other, it is preferable to find the respective crystal sizes by using a peak separation technique. In this manner, by controlling the thickness of constituent layers within a range close to the crystal size, the interaction is exerted not only on the crystal formation inside the layers, but also on the crystal formation between the layers; therefore, it becomes possible to obtain high dimension stability. Moreover, when the average thickness is set to 1 to 5 times, it becomes possible to obtain higher dimension stability. In contrast, when the average thickness is less than the above-mentioned lower limit value, since the crystal formation is virtually suppressed, it sometimes becomes difficult to obtain effects of the dimension stability improvement. Moreover, in the case when the average thickness is greater than the above-mentioned upper limit value, since the interaction is lowered, with the result that the effects of the dimension stability are reduced and the moldability also becomes insufficient.

In the present invention, upon carrying out DSC measurements on the film, two or more peaks, each having a heating value of crystal fusion of 8 J/g or more, are preferably observed. More preferably, the heating value is set to 12 J/g or more. Most preferably, the heating value is set to 15 J/g or more. Although not particularly limited, the upper limit value is preferably set to 100 J/g or less. When two or more peaks, each having a heating value of crystal fusion of 8 J/g or more, are observed, the crystallization of thermoplastic resin A and thermoplastic resin B is sufficiently progressing so that it becomes possible to improve dimension stability under high temperatures. In order to provide two or more peaks, each having a heating value of crystal fusion of 8 J/g or more, the film is preferably formed by at least two or more kinds of crystalline resins, with the rate of the respective crystalline resins in the film being set in a range from 20 wt % or more to 80 wt % or less.

With respect to the laminated film of the present invention, the number of laminated layers is preferably set to 1000 layers or more, with the lamination precision being set to 50% or less. Here, the lamination precision refers to a value obtained through processes in which, with respect to the layers constituting the laminated film, a value obtained by subtracting the thickness of the thinnest layer from the thickness of the thickest layer is divided by the average thickness and then multiplied by 100. More preferably, the lamination precision is set to 40% or less, most preferably, to 20% or less. The lamination precision exceeding 50% or more tends to cause a failure in obtaining effects from the developments in dimension stability and the resulting failure in moldability. In contrast, the lamination precision of 50% or less makes it possible to achieve fine structure controlling operations so that a periodic structure in which crystal and non-crystal are completely separated is formed in the layers; thus, it becomes possible to obtain dimension stability even under higher temperatures.

When the lamination precision becomes 20% or less, the resulting film is allowed to have improved dimension stability and a superior rigidity.

In the film of the present invention, preferably, the elongation percentage to stress characteristic at room temperature (25° C.) at least in one direction satisfies the following expression (1) and/or expressions (2) to (4):

$$0.9 \leqq \sigma 2/\sigma 1 \leqq 1.2 \quad \text{expression (1)}$$

$$\sigma 1 \leqq 120 \quad \text{expression (2)}$$

$$\sigma 2 \leqq 140 \quad \text{expression (3)}$$

$$\sigma 3 \leqq 110 \quad \text{expression (4)}$$

$\sigma 1$: stress at 50% in elongation percentage (MPa)

$\sigma 2$: stress at 100% in elongation percentage (MPa)

$\sigma 3$: yield point stress (MPa)

In the case when the elongation percentage to stress characteristic satisfies the above-mentioned expressions, since film is deformed and is also allowed to follow a large deformation, it is possible to desirably provide a film having superior moldability. With respect to the above-mentioned expressions (1) to (4), more preferably, the following expressions (1a) to (4a) are satisfied:

$$0.92 \leqq \sigma 2/\sigma 1 \leqq 1.17 \quad \text{expression (1a)}$$

$$30 \leqq \sigma 1 \leqq 110 \quad \text{expression (2a)}$$

$$40 \leqq \sigma 2 \leqq 110 \quad \text{expression (3a)}$$

$$50 \leqq \sigma 3 \leqq 100 \quad \text{expression (4a)}$$

Most preferably, the following expressions (1b) to (4b) are satisfied:

$$0.95 \leqq \sigma 2/\sigma 1 \leqq 1.16 \quad \text{expression (1b)}$$

$$60 \leqq \sigma 1 \leqq 100 \quad \text{expression (2b)}$$

$$70 \leqq \sigma 2 \leqq 100 \quad \text{expression (3b)}$$

$$80 \leqq \sigma 3 \leqq 90 \quad \text{expression (4b)}$$

More preferably, the elongation percentage to stress characteristic in the longitudinal direction or in the width direction satisfies the above-mentioned expressions (1) and/or expressions (2) to (4):

The film of the present invention preferably has a structure in which the average Young's modulus in the film longitudinal direction as well as in the film width direction is preferably set in a range from 3 to 5 GPa. Since the resulting film has an appropriate rigidity, it becomes possible to provide a superior handling property and superior moldability. The average Young's modulus is preferably set in a range from 3.2 to 4.8 GPa, more preferably, from 3.4 to 4.2 GPa.

In the film of the present invention, various layers, such as an easy sliding layer, an easy bonding layer, an adhesive layer, an antireflection layer, a hard coat layer, a near-infrared ray shielding layer, an electromagnetic wave shielding layer, an antistatic layer, a conductive layer, a stain-proofing layer, a dew-proofing layer and a printing layer, may be formed inside thereof as well as on the surface layer thereof. Upon forming these layers, not particularly limited, various conventionally-known techniques and the like may be used.

When the film of the present invention is measured by a method described in evaluation method (2) on physical properties by using a thermomechanical tester, the rate of deformation at 180° C. at least in the longitudinal direction is preferably set in a range from −1% or more to 3% or less, more preferably, from −0.3% or more to 1.5% or less. In other words, such a film provides superior dimension stability under high temperatures, and makes it possible to greatly improve the dimension stability in the longitudinal direction which has been difficult to control by using conventional methods, by the use of a structure in which non-crystal portions are extremely slackened as a result of improved interaction between layers, with crystal portions that exert the interaction between layers functioning as joining points. In contrast, the rate of deformation of less than −1% causes shrinkage to become greater, failing to achieve high dimension stability upon molding. Moreover, the rate of deformation exceeding 3% causes the amount of expansion to become greater, causing the same problem. More preferably, the rate of deformation at 180° C. is set in a range from −1% or more to 3% or less in both of the longitudinal direction and width direction.

With respect to the film of the present invention, the yield point stress is preferably set to 100 MPa or less and the breaking elongation is also preferably set to 180% or more, at least in one direction. Since the resulting film is deformed even by a low stress and is also allowed to follow a large deformation, it is possible to desirably provide a film having superior moldability. More preferably, the breaking elongation at least in one direction is set to 200% or more. The breaking elongation of less than 180% is not preferable because a film disconnection occurs in the molding process requiring a large deformation. More preferably, the yield point stress is set to 100 MPa or less and the breaking elongation is set to 180% or more, in the film longitudinal direction or width direction.

In the film of the present invention, an α relaxation temperature, obtained in dynamic viscoelasticity measurements, is observed between (α relaxation temperature of thermoplastic resin B+10)° C. and (α relaxation temperature of thermoplastic resin A−10)° C., with two or more melting points being included. In order to set the α relaxation temperature within this range, preferably, 50 or more layers made from thermoplastic resin A and thermoplastic resin B, each having a thickness of less than 30 nm, are laminated. Here, the resin having a higher α relaxation temperature is defined as thermoplastic resin A. Although the laminated film of the present invention is formed by laminating thermoplastic resin A and thermoplastic resin B having inherently different α relaxation temperatures in dynamic viscoelastic measurements, it has a sufficiently macroscopic shape in the longitudinal direction as well as in the width direction; however, it has a very fine layer shape with a nano-order thickness so that only one α relaxation temperature of the laminated film is observed between (α relaxation temperature of thermoplastic resin B+10)° C. and (α relaxation temperature of thermoplastic resin A−10)° C. as if it were a single resin. In contrast, upon melting-point measurements by DSC, it is essential to have peaks of melting point of individual thermoplastic resin A and thermoplastic resin B and also to prevent thermal properties of the respective resins from being damaged. When these are achieved, it is possible to achieve fine structure controlling operations on the crystal portions and non-crystal portions, and consequently to provide a film that has a high rigidity and superior dimension stability under high temperatures, and is superior in transparency after the heating process as well as in moldability within a wide temperature range, without losing the characteristics of the respective thermoplastic resins. Here, in the present invention, α relaxation, obtained upon measurements on dynamic viscoelasticity, is caused by movements of comparatively long molecular chains in the film non-crystal portions, and corresponds to a glass transition temperature of the extended film ("Rheology Basics", p132, written by Kenkichi Murakami, published on May 30, 1991, by Sangyo Tosho Publishing Co.). The a relaxation temperature of the laminated film of the present invention is more preferably set in a range from (α relaxation temperature of thermoplastic resin B+12)° C. to (α relaxation temperature of thermoplastic resin A−12)° C. This arrangement is more preferable since, among the above-mentioned effects, the transparency after the heating process is further improved. In order to set the α relaxation temperature in this temperature range, for example, the weight ratio of thermoplastic resin A in the laminated film is set in a range from 20 wt % to 80 wt %. Most preferably, the α relaxation temperature of the laminated film of the present invention is set in a range from (α relaxation temperature of thermoplastic resin B+15)° C. to (α relaxation temperature of thermoplastic resin A−15)° C. This arrangement is more preferable since, among the above-mentioned effects, the dimension stability under high temperatures and the transparency after the heating process are further improved. In order to set the α relaxation temperature in this temperature range, for example, the weight ratio of thermoplastic resin A in the film is set in a range from 35 wt % to 65 wt %. When the weight ratio of thermoplastic resin A is less than 20 wt %, the controlling operation of one of the crystals tends to become insufficient, resulting in a reduction in the effects of dimension stability under high temperatures. The weight ratio exceeding 80 wt % also causes the same problem.

With respect to the thermoplastic resins to be used in the present invention, although not particularly limited, the melting point of thermoplastic resin A is preferably made higher than the melting point of thermoplastic resin B by 5° C. or more. In the case when 50 or more layers, each having a thickness of less than 30 nm, are used, the application of the resins of this type allows a periodic structure of lamella composed of crystals of these two resins is formed in the layer so that it becomes possible to provide a film that has a high rigidity and superior dimension stability under high temperatures, and is superior in transparency after the heating process as well as in moldability within a wide temperature range. With respect to the two kinds of thermoplastic resins having a difference of 5° C. or more in melting points, although not particularly limited, when polyethylene terephthalate is used as thermoplastic resin A, the following resins are preferably used as thermoplastic resin B. Examples thereof include: polyester resins such as polybutylene terephthalate and polypropylene terephthalate, polyolefin resins such as polyethylene, polypropylene and polymethyl pentene; polyamide resins such as nylon 6 and nylon 66; or resins formed by copolymerizing polyethylene terephthalate with isophthalic acid, adipic acid, sebacic acid, dimer acid, cyclohexane dicarboxylic acid or the like; however, the present invention is not intended to be limited by these resins.

Moreover, peaks due to α relaxation and/or melting point caused by a third thermoplastic resin and various additives may be observed in addition to those due to α relaxation caused by thermoplastic resin A and thermoplastic resin B.

The film of the present invention is preferably designed so that the thermal expansion coefficient in the longitudinal direction and/or the width direction, exerted when the atmospheric temperature is varied from 50° C. to 65° C., is preferably set to 110 ppm or less. More preferably, this value is set to 100 ppm. In the case of the expansion coefficient of 110 ppm or less, the resulting film can be used without causing any problems during processing or the like. The expansion coefficient may be set to 100 ppm or less by increasing the extension magnification and consequently enhancing the orientation of the film, and this arrangement, which further improves dimension stability without causing serious influences due to expansion, is preferably used. The lower limit value of the thermal expansion coefficient is not particularly determined, and preferably set to a value as small as possible. Although not particularly limited, it is generally determined to about 90 ppm. The thermal expansion coefficient exceeding 110 ppm tends to cause degradation in the dimension stability under high temperatures, with the result that relaxing tends to occur and wrinkles are easily caused, failing to provide a preferable film.

The film of the present invention is preferably designed so that a raised haze value after a heating test for 30 minutes in an atmosphere of 210° C. is preferably set to 15% or less. Here, a raised haze value refers to a difference between haze value (%) after the heating process and haze value (%) before the heating process. This value is preferably set to 10% or less, more preferably, to 5%, most preferably, to 2% or less. For example, 50 or more layers of thermoplastic resin A and thermoplastic resin B are laminated so that an α relaxation temperature of the laminated film, obtained in dynamic viscoelasticity measurements, is observed between (α relaxation temperature of thermoplastic resin B+10)° C. and (α relaxation temperature of thermoplastic resin A−10)° C. with two or more melting points being present; thus, a raised haze value is set to 15% or less. This film is suitably used for a molded body or the like from the viewpoint of transmitting property of light rays. Moreover, upon forming the film, by setting the heat treatment temperature below Tm (melting point) of thermoplastic resin B (with respect to the melting point, thermoplastic resin A>thermoplastic resin B), a raised haze value is set to 10% or less, and this arrangement is desirable because scattering of transmitted light rays is further reduced so that the resulting molded body is prevented from having a white cloudy appearance. Here, Tm refers to a temperature at which, when a sample is heated at a fixed rate by DSC, the heat absorption due to fusion becomes greatest. Moreover, by setting the lamination precision to 30% or less, a raised haze value can be set to 5% or less, and it becomes possible to further reduce scattering of transmitted light rays to provide a film that is superior in transparency; this arrangement is desirable because the resulting molded body is allowed to have a glossy appearance. In order to set the lamination precision to 30% or less, it is preferable to use a feed block that has slits for 200 to 2000 layers with a slit processing precision of +10 μm as a device used for laminating different kinds of thermoplastic resins upon forming the film, and with respect to a static mixer used for increasing the number of laminated layers, it is preferably designed so that its flow path length L satisfies the following expression: $L \geqq Q/(40\sqrt{A})$ (here, L: flow path length [m] of a static mixer, Q: amount of polymer extrusion [t/h], A: cross section [$m^2$] of total flow path). When, upon film-forming, the temperature is set to Tm or less of thermoplastic resin B with the feed block and the static mixer being used, it becomes possible to set a raised haze value to 2% or less; consequently, this arrangement reduces scattering of transmitted light rays, and is desirable because a film that is superior in transparency is obtained and the resulting molded body is allowed to have a glossy appearance more effectively. The lower limit value of a raised haze value is not particularly determined, and the raised value is preferably set to a value as small as possible, so as to minimize the scattering.

The film of the present invention is preferably designed so that, upon measurements on X-ray small angle scattering, spot-shaped scattering is observed in the end direction and/or the edge direction. In the present invention, the spot-shaped scattering indicates that the thickness of lamella structure is larger. In order to provide such a structure, 50 or more layers, each having a thickness of less than 30 nm, are preferably formed, and the extension magnification is preferably adjusted so as to make a difference in physical properties between the longitudinal direction and the width direction smaller. This arrangement is desirable because it becomes possible to increase the interaction between adjacent layers and also to improve the dimension stability under high temperatures and moldability.

The film of the present invention is preferably designed so that ΔTm of thermoplastic resin A or thermoplastic resin B is set to 60° C. or less. Here, ΔTm is a difference between the melting point Tm and the cooling crystallization temperature Tmc, which is found by DSC. The cooling crystallization temperature Tmc refers to a temperature at which, when a sample, which has been heated to the melting point or more so that thermal history has been eliminated, is cooled at a constant rate, heat radiation due to crystallization becomes highest. In the case when ΔTm of thermoplastic resin A or thermoplastic resin B is set to 60° C. or less, with 50 or more layers each having a thickness of less than 30 nm being contained, the lamella periodic structure made from the two resins is formed within the layer so that an appropriate crystallization rate is prepared; therefore, this arrangement is preferable in an attempt to further improve the dimension stability under high temperatures and the moldability.

The film of the present invention is preferably formed to have a thickness in a range from 1 μm or more to 600 μm or less. When the thickness is thinner than 1 μm, wrinkles tend to occur to cause degradation in handling, failing to provide a desirable film, and in the case of the number of laminated layers of 1000 or more, the thickness per layer becomes too small, failing to provide a desirable film. Moreover, when the thickness is larger than 600 μm, the film-forming process becomes difficult, the production efficiency is lowered due to an increased number of layers and the handling property deteriorates upon processing time, because the thickness becomes too large.

The film of the present invention is preferably designed so that a difference in physical properties in the longitudinal direction and in the width direction is made smaller with a well balanced structure longitudinally as well as laterally. More specifically, a difference between values of breaking elongation (%) in the longitudinal direction and breaking elongation (%) in the width direction is set within 50%. With this arrangement, it becomes possible not only to improve the dimension stability under high temperatures and the moldability in a wide temperature range, but also to provide a film that is superior in transparency after the heating process. Generally, setting physical properties to a well-balanced state is preferable; however, in the case of the laminated film of the present invention, since a peculiar layer structure in a nano order close to a molecular order is formed, extension behaviors are different from those of the conventional structure, with the result that a necking extension tends to occur frequently making it difficult to carry out controlling operations on the physical property balance. In order to solve this problem, various research efforts have been made to find that with respect to the thickness of an unextended film in the width direction, it is desirable to set the thickness of a film edge portion within 2.5 times the thickness of the film center portion. When the unextended film is allowed to have such a thickness, it is possible to easily control the balance of physical properties and also to reduce irregularities in the thickness in the width direction after the biaxial extension; thus, it becomes possible to provide a desirable film-forming property. Moreover, the period of time for a pre-heating process to be carried out before the extension is preferably set within 20 seconds. The pre-heating time that is longer than 20 seconds allows crystallization of the film to progress to cause degradation in the extending property, failing to provide a preferable film. Moreover, the pre-heating temperature and the extending temperature in the pre-heating process at the time of longitudinal extension and lateral extension are preferably set to temperatures between the glass transition temperature of thermoplastic resin A and the glass transition temperature of thermoplastic resin B, and the extension magnification is preferably set in a range from 2.8 times to 3.5 times. When the film-forming processes are carried out under these extension conditions, the resin crystallization of both of thermoplastic resin A and thermoplastic resin B is controlled so that the resulting film has a superior transparency after the heating process, and the orientations in the length and width directions are set to the same degree, with a well-balanced state longitudinally as well as laterally; therefore, it becomes possible to improve the dimension stability under high temperatures as well as the moldability with a wide temperature range. In contrast, when the conventional laminated film is extended under such temperature conditions, a problem arises in which tearing frequently occurs. By the use of the present invention, it becomes possible to extend the film under such temperature conditions as well as under un-extended film conditions.

The following description will exemplify a method in which two kinds of thermoplastic resins are laminated into multiple layers, as a preferable manufacturing method of a laminated film or a biaxial oriented polyester film of the present invention; however, the present invention is not intended to be limited by this manufacturing method.

Thermoplastic resin A and thermoplastic resin B are prepared as pellets or the like. These pellets are preliminarily dried in hot air or in vacuum, if necessary, and supplied to an extruder. In the extruder, the resin, which has been heated and melted to the melting point or more, is filtered to remove foreign matters and denatured resin through a filter or the like, with the amount of extrusion of the resin being evenly controlled by a gear pump or the like. After having been molded into a target shape through a die, the resulting resin is discharged.

With respect to the method used for obtaining a multilayered film, a method in which portions of thermoplastic resin, transferred from different flow paths by using two or more extruders, are laminated into multiple layers by using a multi-manifold die, a feed block, a static mixer and the like may be used. Moreover, these devices may be desirably combined. Here, in order to efficiently obtain the effects of the present invention, at least, feed blocks for 500 layers or more are preferably used. Moreover, the pressure loss in these feed blocks is preferably set in a range from 3 MPa or more to 10 MPa or less. When the feed blocks for 500 layers or more are used, laminated films, which have lamination precision of 50% or less, with the number of layers being set to 1000 layers or more, in accordance with a preferred embodiment of the present invention, are preferably obtained. Moreover, when the pressure loss at the feed blocks is set to 3 MPa or more to 10 MPa or less, it becomes possible to easily obtain a laminated film having a lamination precision of 40% or less with the number of layers being set to 1000 or more so that a desirable method is provided. Moreover, when a difference between the molten viscosity at 10 $s^{-1}$ and the molten viscosity at 100 $s^{-1}$ is set to 1000 poise or less, the lamination precision is set to 20% or less so that it becomes possible to easily obtain a laminated film having the number of layers of 1000 or more.

A sheet, laminated with a multiple layers discharged from the die, is extruded onto a cooling body such as a casting drum, and cooled and solidified so that a casting film is obtained. At this time, a method in which the sheet is adhered to the cooling body such as a casting drum through an electrostatic force by using an electrode having a wire shape, a tape shape, a needle shape or a knife shape, so as to be quickly cooled and solidified, or a method in which the sheet is adhered to the cooling body such as a casting drum by blowing air from a slit-shaped or spot-shaped device so as to be quickly cooled and solidified, may be used. The casting film thus obtained is biaxially extended, if necessary. The biaxial extension refers to extending processes in the longitudinal direction (=film longitudinal direction) and in the lateral direction (=film width direction). The biaxially extended film is desirable since it has a high rigidity and superior dimension stability even under high temperatures. The extending processes may be sequential biaxiall extended, or simultaneous biaxial extended in the two directions. Moreover, the film may be re-extended longitudinally and/or laterally.

Here, the extension in the longitudinal direction refers to an extension used for subjecting the film to a molecular orientation in the longitudinal direction, and this process is normally carried out by utilizing a difference in peripheral speeds of rollers. This extending process may be carried out in one stage, or may be carried out in multiple stages by using a plurality of pairs of rollers. With respect to the magnification of extension, although different depending on the kind of the resin, it is normally set in a range from two times to 15 times, and when polyethylene terephthalate, which accounts for more than half of the amount of the resin forming the laminated film, is used, it is more preferably set in a range from two times to seven times. In an attempt to make a difference in physical properties between the longitudinal direction and the width direction smaller and consequently to improve the dimension stability and moldability, it is preferably set in a range from 2.8 times to 3.5 times. Moreover, the extension temperature is preferably set in a range from the glass transition temperature of the resin forming the laminated film to the glass transition temperature +100° C. In an attempt to make a difference in physical properties between the longitudinal direction and the width direction smaller and consequently to improve the dimension stability and moldability, the preheating and extension processes are preferably carried out at temperatures between the glass transition temperature of thermoplastic resin A and the glass transition temperature of thermoplastic resin B.

After the mono-axially extended film thus obtained has been subjected to surface treatments, such as a corona treatment, a frame treatment and a plasma treatment, the resulting film may be subjected to inline coating processes to apply functions such as easy-sliding, easy-bonding and static eliminating properties thereto.

Here, the lateral extension refers to an extension process used for orienting the film in the width direction, and this extension process is normally carried out in the width direction by using a tenter while holding the two ends of the film with clips. Although different depending on the kind of a resin, the magnification of extension is normally set in a range from 2 to 15 times, and when polyethylene terephthalate, which accounts for more than half of the amount of the resin forming the laminated film, is used, it is more preferably set in a range from two times to seven times. In an attempt to make a difference in physical properties between the longitudinal direction and the width direction smaller and consequently to improve the dimension stability and moldability, it is preferably set in a range from 2.8 times to 3.5 times. Moreover, the extension temperature is preferably set in a range from the glass transition temperature of the resin forming the laminated film to the glass transition temperature +120° C. In an attempt to make a difference in physical properties between the longitudinal direction and the width direction smaller and consequently to improve the dimension stability and moldability, the pre-heating and extension processes are preferably carried out at temperatures between the glass transition temperature of thermoplastic resin A and the glass transition temperature of thermoplastic resin B.

The biaxially extended film thus obtained is preferably subjected to a heating treatment in the tenter at a temperature in a range from the extension temperature or more to the melting point or less so as to impart proper flatness and dimension stability thereto. More preferably, the temperature range is set from the melting point of thermoplastic resin A or less to the melting point of thermoplastic resin B or more (in this case, the melting point of thermoplastic resin A>the melting point of thermoplastic resin B). When the film is subjected to the heating treatment at a temperature in a range from the melting point of thermoplastic resin A or less to the melting point of thermoplastic resin B or more, the aforementioned periodic structure is formed inside the layer so that it becomes possible to obtain higher dimension stability and moldability. More preferably, heating treatments in two stages of temperatures, which, after having carried out heating treatments at a temperature in a range from the melting point of thermoplastic resin A or less to the melting point of thermoplastic resin B or more (in this case, the melting point of thermoplastic resin A>the melting point of thermoplastic resin B), carries out a heating treatment at a temperature under the melting points of both of the resins A and B, may be preferably used. The heating treatment temperature in the second stage is preferably set at a temperature 20° C. or more, more preferably 30° C. or more, lower than the heating treatment temperature in the first stage. By carrying out the heating treatment at heating treatment temperatures of two stages, it becomes possible to obtain high-temperature resistant dimension stability and appropriate moldability. The biaxially extended film thus obtained is preferably further subjected to a heating treatment at a temperature from the extension temperature or more to the melting point or less in the tenter, in order to prepare suitable flatness and dimension stability. After having been subjected to the heating treatment in this manner, the film is evenly cooled off and then cooled to room temperature and wound up. Moreover, if necessary, upon cooling off from the heating treatment, a relaxing treatment or the like may be carried out in combination.

The laminated film or the biaxial oriented polyester film of the present invention thus obtained is desirably used for various molding processes as a molded body. Although not particularly limited, the processing method, which is a processing method that requires an easy-molding property, is exemplified by a surface treatment, emboss treatment, sand mapping treatment, squeezing treatment, vacuum molding, vacuum air-compression molding, inmold laminating, cold extension, inmold stamping or insert molding process, and when the laminated film is used as a product or a supporting member in these methods, the laminated film needs to be molded into a required shape.

Moreover, the film of the present invention is suitably used as a material for a transfer foil. The transfer foil, which has a structure in which a peeling layer, ink, a bonding layer and the like are superposed on a base film, is used when a picture pattern is transferred on a molded product, or simultaneously transferred on a product that is being molded by using heat and pressure. Since the laminated film of the present invention is superior in moldability within a wide temperature range, it is preferably used as a base film for transfer foil, and also used for transferring a picture pattern on a product having a complex shape.

Moreover, the film of the present invention is preferably used as an outer jacketing member for a lithium ion battery and the like. In the application of the outer jacketing member for a lithium ion battery, a molding process at a deep contraction ratio is required with a structure in which, in addition to a polypropylene film and aluminum foil, a nylon film, a PET film and the like are bonded thereto. The laminated film of the present invention can be molded into a deeply contracted or a complicated shape in comparison with the conventional film, and has a high rigidity and is superior in transparency and appearance, with a high chemical resistance. Therefore, the laminated film of the present invention is bonded to an unextended polypropylene film and aluminum foil to be preferably used as an outer jacketing member for a lithium battery.

The film of the present invention may be adhered to metal, wood, paper, resin and the like to be joined thereto, and used. More specifically, after a picture pattern layer or a colored layer has been placed on the surface of each of these materials through a printing process or the like, the resulting film may be joined through a thermal bonding processor a bonding agent and used, or after a picture pattern layer or a colored layer has been placed on the film of the present invention through printing or the like, the resulting picture pattern layer or the colored layer may be joined to plate members of various types and used.

With respect to the bonding agent, examples thereof include: a urea resin-based bonding agent, a melamine resin-based bonding agent, a phenol resin-based bonding agent, an α-olefin resin bonding agent, a bonding agent derived from a mixture between an aqueous polymer and isocyanate, an epoxy-based bonding agent, a solution-type vinyl acetate resin-based bonding agent, an emulsion-type vinyl acetate resin-based bonding agent, an acrylic emulsion-based bonding agent, a hot-melt bonding agent, a cyanoacrylate-based bonding agent, a polyurethane-based bonding agent, a chloroprene rubber-based bonding agent, a nitrile rubber-based bonding agent, a SBR-based bonding agent, a modified rubber emulsion-based bonding agent, an ethylene copolymer resin-based bonding agent, a resorcine-based bonding agent, natural rubber-based bonding agent, a cellulose-based bonding agent, starch paste and dextrin.

The film of the present invention may be desirably used for a transfer inmolding process. More specifically, the process includes steps in which: the resin is poured onto a sheet that has been processed into a structure constituted by a film/a releasing layer/a top layer (hard coat layer)/a printing layer/a bonding layer and the like, and by separating the film from the releasing layer so that the printing process and the molding process of the member are simultaneously carried out.

The film may be also desirably used for a molding process such as an ink-injection mold decoration. With respect to the resin to be used for the transfer inmolding process or the injection-mold decoration process, resins, such as ABS, acrylic resins and polycarbonate, are preferably used because these have a desirable adhesive property and adhesion.

The film of the present invention may be used for molding processes that include various surface treatment processes such as an embossing process and a printing process, and, for example, the film having been subjected to a printing process is bonded to a steel plate, and this is subjected to a shaping process such as a bending process and a compressing process depending on the purpose so that the resulting film can be desirably used for a surface material for furniture, building materials (wall materials or the like), housing equipment and electronic devices (such as switches), as well as for base materials for interiors.

EXAMPLE

The following description will discuss evaluation methods on physical property values used in the present invention.

(Evaluation Methods on Physical Property Values)

(1) Laminated-layer Thickness, Number of Laminated Layers and Lamination Precision With respect to a sample the section of which was cut out by using a microtome, the layer structure of a film was found through observation under an electron microscope. In other words, by using a transmission-type electron microscope Model HU-12 (made by Hitachi, Ltd.), the section of the film was enlarged by 3000 to 200000 times and observed, and the sectional photograph was taken so that the layer structure and the thickness of each of layers were measured. Moreover, with respect to the lamination precision, a difference between the thickness of the thickest layer and the thickness of the thinnest layer was found among layers constituting the laminated film, and this value was divided by an average layer thickness, and multiplied by 100 so that the corresponding value was obtained. Moreover, with respect to the average layer thickness, the average value of thicknesses of 30 layers randomly extracted from the layers having the same composition was adopted. Here, in order to clarify the layer structure, a dyeing process was carried out by using $RuO_4$ dyeing method.

(2) Dimension Stability

With respect to the dimension stability, by using a thermal machine tester (EXTRA6000 & TMA/SS6000) made by Seiko Instruments Inc., the amount of extension was evaluated under a constant force mode. The evaluation was conducted under the following conditions, and the amount of deformation at 180° C. was defined as the dimension stability. Here, the amount of deformation obtained as a minus value represents shrinkage, and the amount of deformation obtained as a plus value represents extension. Moreover, the number n was set to 3 times, and the average value thereof was used.

Temperature condition: Start 30° C.→(Rate of temperature rise: 10° C./min.)→End 250° C.

Load: 0.0294 N

Sample shape: Length 20 mm, width 4 mm (chuck-to-chuck distance: 15 mm)

(3) Breaking Elongation, Yield Point Stress, Stress and Young's Modulus

The yield point stress and breaking elongation were measured under an environment of 25° C. and 65% RH by using an instron-type tension tester (Film-tensile elongation automatic measuring device "Tensiron AMF/RTA-100", made by Orientic Co., Ltd.), in compliance with JIS-K7127 (enacted in 1989). With respect to the film longitudinal direction and the film width direction, a sample film of 10 mm in width was extended under conditions of a testing length of 100 mm and tensile rate 200 mm/min so that the breaking elongation, yield point stress, stress and Young's modulus were found. Here, the number n was set to 5 times, and the average value was used.

(4) Crystal Size

The crystal size refers to a size that is obtained through measurements by a wide angle X-ray diffraction meter, made by Rigaku Denki K.K. under the following conditions and calculations by using Scherrer's equation based upon a half-value width derived from 2θ/θ strength data of a face in the sectional direction. In this case, when peaks of crystalline resin A and crystalline resin B were overlapped with each other, the respective crystal sizes were obtained by using a peak separation technique.

X-ray generating device Model 4036A2, made by Rigaku Denki K.K.

X-ray source: CuKα-ray (using Ni filter)

Output: 40 kV 20 mA

Goniometer, made by Rigaku Denki K.K.

Slit system: 2 mmϕ-1°-1°

Detector: Scintillation Counter

Counter recording device Model RAD-C, made by Rigaku Denki K.K.

Measuring Conditions Scanning method: 2θ/θ step scan

Measuring range: 2θ=5 to 60°

Step: 0.05°

Integrating time: 2 seconds

<Scherrer's Equation>

$$L=K\lambda(\beta_0\times\cos\theta_B)$$

L: Crystal size [nm]

T K: Constant (=1.0)

λ: Wavelength of X-ray (=0.15418 nm)

$\theta_B$: Black angle $\beta_0=(\beta_E^2-\beta_I^2)^{1/2}$ $\beta_E$=Half-value width (actual measured value)

$\beta_I$: Device constant ($=1.046\times10^{-2}$)

(5) Melting Point, Quantity of Crystal Heat of Fusion, Cooling Crystallization Temperature By using differential scanning calorimetry (DSC), measurements and calculations were carried out in compliance with JIS-K-7122 (1987).

Device: "Robot DSC-RDC220" made by Seiko Denshi K.K.

Data analysis "Disk Session SSC/5200"

Sample mass: 5 mg

Temperature heating rate: 20° C./min (6) Inherent Viscosity

Calculations were carried out based upon solution viscosity measured at 25° C. in orthochlorophenol. Moreover, the solution viscosity was measured by using an Ostwald viscometer. The unit was indicated by [d1/g]. The number of n was set to 3 times, and the average value was used.

(7) Density

The film density was measured by using a sodium bromide solution by using a density gradient tube method in compliance with JIS-K-7112 (revised in 1980).

(8) Heat Shrinkage

By setting a length between bench marks of a film sample to 100 mm, a film was cut into pieces with a width of 10 mm, and the film sample was suspended in the longitudinal direction, with a load of 0.0294N being applied in the longitudinal direction, and after this has been heated by hot air of 180° C. for 30 minutes, the length between bench marks was measured so that the amount of shrinkage of the film was indicated by percentage as a rate to the original dimension.

(9) Printing Processability

A transfer inmolding process was carried out with a height of 25 mm, a width of 200 mm and a length of 180 mm (n=3), and evaluations were conducted based upon the following criteria. More than Class B was considered as success.

Class A: A clear printed face without spots was desirably obtained.

Class B: Although slight printed spots were partially found, no problems were raised in practical use.

Class C: Tearing was found with excessive printed spots, raising problems in practical use.

(10) Dynamic Viscoelasticity

The dynamic viscoelasticity was evaluated by using an EXSTRA 6000 & DMS6100 made by Seiko Instruments Inc. With respect to the longitudinal direction, a sample was temperature-raised at a temperature heating rate of 2° C./min from −150° C. to 220° C., and the peak temperature of α relaxation was read from tan δ so that the resulting value was used as α relaxation temperature. The frequency was set to 1 Hz, and the sample shape was 20 mm in length and 10 mm in width.

(11) Thermal Expansion Coefficient

The thermal expansion coefficient was evaluated by using a thermal machine tester (EXTAR6000 & TMA/SS6000) made by Seiko Instruments Inc. The sample was 20 mm in length and 4 mm in width, and the film was held between chucks (distance L=15 mm) of a constant load elongation amount tester, with respect to each of the longitudinal direction and the width direction. The temperature was raised at a temperature heating rate of 10° C./min from 30° C. to 150° C., and the temperature was lowered at a temperature cooling rate of 10° C./min from 150° C. to 30° C. The amount of deformation during this temperature dropping process from 65° C. to 50° C. was found based upon the average gradient. The load was set to a constant value of 0.0294 N during the measurements.

(12) Haze

After a film had been left at 25° C. and a relative humidity of 65% for 2 hours, the haze was measured by using a complete automatic direct-reading haze computer "HGM-2DP" made by Suga Test Instruments Co., Ltd. The average value of measured values of three times was taken as the haze value. Here, with respect to a method of measuring a raised haze value after the heating test, the method was used in which: a sample was pasted to a metal frame so as not to be shrunk and deformed, and this was heated for 30 minutes in a gear oven GHPS-222 made by TABAI, which was set to 210° C., and then taken out. The haze value of the sample after the heating process was measured by using the above-mentioned method so that the raised haze value after the heating test was found.

Raised haze value after the heating process=Haze after the heating process (%)−Haze before the heating process (%)

(13) Crystal Structure Based Upon X-ray Small Angle Scattering Measurements

The measurements were carried out by using an X-ray generator RU-200, made by Rigaku Denki K.K. The conditions are: X-ray source: CuKα-ray (using Ni filter), an output of 50 kV and 200 mA, a slit system of 0.5 mmϕ, a camera radius of 405 mm and exposed time of 60 min. The results are shown in Table 2.

(14) Vacuum Molding Test

The test was carried out by using a vacuum molding device SANWA KOGYO PLAVAC TYPE FB-7. A cylinder-shaped cup having a depth of 15 mm and a diameter of 50 mm was pressed onto a sample heated to 193° C., and air inside the cup was drawn out instantaneously into a vacuum state. In this case, those samples that were deformed in accordance with the shape of the cup were determined as having a high moldability, and ranked as A. Those samples, which, although deformed in accordance with the cup, failed to be sufficiently molded in the corner portions, were ranked as B. Moreover, those samples, which were not deformed in accordance with the cup, and were hardly deformed, were determined as low in moldability and ranked as C.

(15) Moldability

A cylinder-shaped mold having a diameter of 6.3 cm, which had been heated to 180° C., was pushed into a film, and a molding process was carried out at a drawing ratio of 0.6, and evaluations were conducted based upon the following criteria. More than Class B was considered as success.

Class A: The film was uniformly molded and the molded product had no relaxing.

Class B: Although biasly raised portions were partially found, the film was uniformly molded as a whole, and the molded product had no relaxing.

Class C: The film was obviously molded irregularly, and a roughened surface was confirmed.

Example 1

Polyethylene terephthalate (PET) having an inherent viscosity of 0.65 was used as thermoplastic resin A. Moreover, polybutylene terephthalate (PBT) having an inherent viscosity of 1.2, that is, Torecon 1200S made by Toray Industries, was used as polyester B. After having been respectively dried, these thermoplastic resins A and B were supplied to the extruder.

Thermoplastic resins A and B were respectively formed into a molten state at 280° C. by the extruder, and allowed to pass through a gear pump and a filter, and then joined with each other through a feed block (pressure loss: 6 MPa) for 601 layers. The joined thermoplastic resins A and B were supplied to a static mixer with a square flow path shape, and formed into a structure in which 601 layers of polyester A and 600 layers of polyester B that were alternately laminated in the thickness direction, with two surface layer portions being made from polyester A. Here, the discharging amounts were adjusted so that the laminate layer thickness ratio (=weight ratio) was set to A/B=1. After the laminated body constituted by 1201 layers thus obtained had been supplied to a T die and molded into a sheet shape, the resulting laminated body was quickly cooled and solidified on a casting drum maintained at a surface temperature of 20° C., with static electricity being applied thereto.

The resulting cast film was heated by a group of rollers set at 80° C., and extended in the longitudinal direction by 3.3 times. This mono-axially extended film was directed to a tenter, and after having been preheated by hot air at 80° C., was further extended in the lateral direction by 4.0 times. The extended film, as it was, was subjected to a heating treatment in the tenter by hot air at 235° C., and successively subjected to a relaxing treatment of 5%, and after having been cooled to room temperature, the resulting film was wound up. The thickness of the resulting film was 15 μm. The average layer thickness of the resulting laminated film was 12 nm, with 1000 or more layers, each having a thickness of less than 30 nm, being included; thus, a film that had a high rigidity and was superior in dimension stability under high temperatures as well as in moldability was obtained. The results thereof are shown in Table 1.

Example 2

By using the same devices and conditions as Example 1, a laminated film constituted by a total of 301 layers was obtained. However, only the feed block for 301 layers with a pressure loss of 4 MPa was used as the lamination device, and the thickness of the laminated film was set to 6 μm. The average layer thickness of the laminated film was 20 nm, with 250 or more layers, each having a thickness of less than 30 nm, being included; thus, a film that had a high rigidity and was superior in dimension stability under high temperatures as well as in moldability was obtained. The results thereof are shown in Table 1.

Example 3

By using the same devices and conditions as Example 2, a laminated film constituted by a total of 301 layers was obtained. However, a feed block for 76 layers with a pressure loss of 1 MPa and a static mixer having a square flow-path shape were used. The thickness of the laminated film was set to 6 μm. The average layer thickness of the laminated film was 20 nm, with 62 layers, each having a thickness of less than 30 nm, being included; thus, a film that had a high rigidity and was superior in dimension stability under high temperatures as well as in moldability was obtained. The results thereof are shown in Table 1.

Example 4

By using the same devices and conditions as Example 1, a laminated film constituted by a total of 1201 layers was obtained. However, polyethylene isophthalate (PEI) having an inherent viscosity of 0.68 was used as thermoplastic resin B. The average layer thickness of the laminated film was 12 nm, with 1000 or more layers, each having a thickness of less than 30 nm, being included; thus, a film that had a high rigidity and was superior in dimension stability under high temperatures as well as in moldability was obtained. The results thereof are shown in Table 1.

Example 5

By using the same devices and conditions as Example 1, a laminated film constituted by a total of 1201 layers was obtained. However, polypropylene terephthalate (PPT) having an inherent viscosity of 1.4, that is, SORONA P90D made by DuPont de Nemours and Company, was used as thermoplastic resin B. The average layer thickness of the laminated film was 12 nm, with 1000 or more layers, each having a thickness of less than 30 nm, being included; thus, a film that had a high rigidity and was superior in dimension stability under high temperatures as well as in moldability was obtained. The results thereof are shown in Table 2.

Example 6

By using the same devices and conditions as Example 1, a laminated film constituted by a total of 1201 layers was obtained. However, cyclohexane dimethanol 30 mol copolymer polyethylene terephthalate (PE-CHDM/T) having an inherent viscosity of 0.8, that is, PETG6763 made by Eastman Chemical Products, Inc., was used as thermoplastic resin B, and this was heated through a group of rollers set at 90° C., and extended by 3.3 times in the longitudinal direction. This mono-axially extended film was directed to a tenter, and after having been preheated by hot air at 100° C., was further extended in the lateral direction by 4.0 times. The extended film, as it was, was subjected to a heating treatment in the tenter by hot air at 235° C., and successively subjected to a relaxing treatment of 5%, and after having been cooled to room temperature, the resulting film was wound up. The average layer thickness of the resulting laminated film was 12 nm, with 1000 or more layers, each having a thickness of less than 30 nm, being included; thus, a film that had a high rigidity and was superior in dimension stability under high temperatures as well as in moldability was obtained. The results thereof are shown in Table 2.

Example 7

By using the same devices and conditions as Example 1, a laminated film constituted by a total of 1201 layers was obtained. Here, the thickness of the laminated film was set to 32 μm by adjusting the film-forming rate. The average layer thickness of the laminated film was 27 nm, with 1000 or more layers, each having a thickness of less than 30 nm, being included; thus, a film that had a high rigidity and was superior in dimension stability under high temperatures as well as in moldability was obtained. The results thereof are shown in Table 2.

Example 8

By using the same devices and conditions as Example 1, a laminated film constituted by a total of 1201 layers was obtained. However, the discharging amounts of thermoplastic resin A and thermoplastic resin B were adjusted so that the laminated layer thickness was set to A/B=8/2. The average layer thickness of the laminated film was 15 μm, the average layer thickness of thermoplastic resin A was 20 nm and the average layer thickness of thermoplastic resin B was 5 nm. Moreover, 1000 or more layers, each having a thickness of less than 30 nm were included therein; thus, a film that had a high rigidity and was superior in dimension stability under high temperatures as well as in moldability was obtained. The results thereof are shown in Table 3.

Example 9

By using the same devices and conditions as Example 1, a laminated film constituted by a total of 1201 layers was obtained. However, the discharging amounts of thermoplastic resin A and thermoplastic resin B were adjusted so that the laminated layer thickness was set to A/B=4/6. The average layer thickness of the laminated film was 15 μm, the average layer thickness of thermoplastic resin A was 10 nm and the average layer thickness of thermoplastic resin B was 15 nm. Moreover, 1000 or more layers, each having a thickness of less than 30 nm were included therein; thus, a film that had a high rigidity and was superior in dimension stability under high temperatures as well as in moldability was obtained. The results thereof are shown in Table 3.

Example 10

By using the same devices and conditions as Example 1, a laminated film constituted by a total of 1201 layers was obtained. However, a feed block for 301 layers with a pressure loss of 1 MPa and a static mixer were used as lamination devices. The average layer thickness of the laminated film was 12 nm, with 810 layers, each having a thickness of less than 30 nm, being included; thus, a film that had a high rigidity and was superior in dimension stability under high temperatures as well as in moldability was obtained. The results thereof are shown in Table 1.

Example 11

By using the same devices and conditions as Example 1, a laminated film constituted by a total of 1201 layers was obtained. However, the temperature of the heating treatment was set to 190° C. The thickness of the resulting film was 15 μm. The average layer thickness of the laminated film was 12 nm, with 1000 or more layers, each having a thickness of less than 30 nm, being included; thus, a film that had a high rigidity and was superior in dimension stability under high temperatures as well as in moldability was obtained. The results thereof are shown in Table 3.

Example 12

By using the same devices and conditions as Example 1, a laminated film constituted by a total of 4001 layers was obtained. However, a feed block for 1001 layers with a pressure loss of 8 MPa and a static mixer having a square flow-path shape were used as lamination devices. The thickness of the resulting film was 12 μm. The average layer thickness of the resulting laminated film was 3 nm, with 3000 or more layers, each having a thickness of less than 30 nm, being included; thus, a film that had a high rigidity and was superior in dimension stability under high temperatures as well as in moldability was obtained. The results thereof are shown in Table 4.

Comparative Example 1

Polyethylene terephthalate (PET) having an inherent viscosity of 0.65 was used as thermoplastic resin A. After having been dried, thermoplastic resin A was supplied to an extruder.

Thermoplastic resin A was formed into a molten state at 280° C. by the extruder, and allowed to pass through a gear pump and a filter, and then supplied to a T die, and after having been molded into a sheet shape, the resulting laminated body was quickly cooled and solidified on a casting drum maintained at a surface temperature of 20° C., with static electricity being applied thereto.

The resulting cast film was heated by a group of rollers set at 90° C., and extended in the longitudinal direction by 3.5 times. This mono-axially extended film was directed to a tenter, and after having been preheated by hot air at 100° C., was further extended in the lateral direction by 4.8 times. The extended film, as it was, was subjected to a heating treatment in the tenter by hot air at 235° C., and successively subjected to a relaxing treatment of 5%, and after having been cooled to room temperature, the resulting film was wound up. The thickness of the resulting film was 15 μm. The resulting film was poor in dimension stability under high temperatures as well as in moldability. The results thereof are shown in Table 4.

Comparative Example 2

By using the same devices and conditions as Example 3, a laminated film constituted by a total of 301 layers was obtained. The thickness of the laminated film was set to 10 μm. The average layer thickness of the laminated film was 33 nm, with 41 layers, each having a thickness of less than 30 nm, being included. The resulting film was poor in dimension stability under high temperatures as well as in moldability. The results thereof are shown in Table 4.

Comparative Example 3

By using the same devices and conditions as Example 2, a laminated film constituted by a total of 301 layers was obtained, and in this case, the thickness of the laminated film was set to 15 μm. The average layer thickness of the laminated film was 50 nm, and no layers having a thickness of less than 30 nm were included therein. The resulting film was poor in dimension stability under high temperatures as well as in moldability. The results thereof are shown in Table 4.

Example 13

Polyethylene terephthalate (PET) having an inherent viscosity of 0.65 and a melting point of 260° C. was used as thermoplastic resin A. Moreover, polybutylene terephthalate (PBT) having an inherent viscosity of 1.2 and a melting point of 240° C., that is, Torecon 1200S made by Toray Industries, was used as polyester B. After having been respectively dried, these thermoplastic resins A and B were supplied to the extruder.

Thermoplastic resins A and B were respectively formed into a molten state at 280° C. by the extruder, and allowed to pass through a gear pump and a filter, and then joined with each other through a feed block (pressure loss: 6 MPa) for 251 layers. The joined thermoplastic resins A and B were supplied to a static mixer with a square flow-path shape, and formed into a structure in which 501 layers of polyester A and 500 layers of polyester B that were alternately laminated in the thickness direction, with two surface layer portions being made from polyester A. Here, the discharging amounts were adjusted so that the laminate layer thickness ratio (=weight ratio) was set to A/B=1. After the laminated body constituted by 1001 layers thus obtained had been supplied to a T die and molded into a sheet shape, the resulting laminated body was quickly cooled and solidified on a casting drum maintained at a surface temperature of 20° C., with static electricity being applied thereto.

The resulting cast film was heated by a group of rollers set at 90° C., and extended in the longitudinal direction by 3 times. This mono-axially extended film was directed to a tenter, and after having been preheated by hot air at 95° C., was further extended in the lateral direction by 4.2 times. The extended film, as it was, was subjected to a heating treatment 1 in the tenter by hot air at 235° C., and then subjected to a heating treatment 2 by hot air at 2.00° C., and after having been cooled to room temperature, the resulting film was wound up. The thickness of the resulting film was 12 μm. Here, the lamination precision was 20% or less (the same is true in the other Examples). The average layer thickness of the resulting laminated film was 12 nm, and a film that was superior in dimension stability under high temperatures as well as in moldability was obtained. The results thereof are shown in Table 5.

Example 14

By using the same processes as Example 13 except that the number of laminated layers was changed, a biaxial oriented polyester film was obtained. Here, the number of steps of a square mixer was adjusted so that a laminated film composed of 2001 layers was obtained. The average layer thickness of the laminated film was 6 nm, and a film that was superior in dimension stability under high temperatures as well as in moldability was obtained. The results thereof are shown in Table 5.

Reference Example 1

By carrying out the same processes under the same conditions as Example 13 except that a feed block (pressure loss: 3 MPa) for the number of laminated layers of 305 was used and that no square static mixer was used, a laminated film composed of a total of 305 layers was obtained. Here, the thickness of the laminated film was set to 12 μm. The average layer thickness of the laminated film was 40 nm, and a film that was superior in dimension stability under high temperatures as well as in moldability was obtained. The results thereof are shown in Table 5.

Reference Example 2

By carrying the same processes under the same conditions as Example 13 except that a feed block (pressure loss: 3 MPa) for the number of laminated layers of 39 and that square mixer was used, a laminated film composed of a total of 305 layers was obtained. Here, the thickness of the laminated film was set to 12 μm. The average layer thickness of the laminated film was 40 nm, and a film that was superior in dimension stability under high temperatures as well as in moldability was obtained. The results thereof are shown in Table 6.

Example 15

By using the same processes and conditions as Example 13 except that polyethylene isophthalate (PEI) having an inherent viscosity of 0.68 and a melting point of 220° C. was used as thermoplastic resin B, a laminated film composed of a total of 1001 layers was obtained. Here, the average thickness of the laminated film was 12 nm, and a film that was superior in dimension stability under high temperatures as well as in moldability was obtained. The results thereof are shown in Table 6.

Example 16

By using the same processes and conditions as Example 13 except that polybutylene (terephthalate/isophthalate) copolymer (PBT/I) having an inherent viscosity of 1.4 and a melting point of 240° C. was used as thermoplastic resin B, a laminated film composed of a total of 1001 layers was obtained. Here, the average thickness of the laminated film was 12 nm, and a film that was superior in dimension stability under high temperatures as well as in moldability was obtained. The results thereof are shown in Table 6.

Example 17

By using the same processes and conditions as Example 13 except that the laminated layer ratio was changed as shown in Table 6, a film was obtained. The average layer thickness of the laminated film was set to A layer 10 nm/B layer 14 nm, and a film that was superior in dimension stability under high temperatures as well as in moldability was obtained.

Comparative Example 4

Polyethylene terephthalate (PET) having an inherent viscosity of 0.65 was used as thermoplastic resin A. After having been dried, thermoplastic resin A was supplied to an extruder.

Thermoplastic resin A was formed into a molten state at 280° C. by the extruder, and allowed to pass through a gear pump and a filter, and then supplied to a T die, and after having been molded into a sheet shape, the resulting laminated body was quickly cooled and solidified on a casting drum maintained at a surface temperature of 20° C., with static electricity being applied thereto.

The resulting cast film was heated by a group of rollers set at 90° C., and extended in the longitudinal direction by 3 times. This mono-axially extended film was directed to a tenter, and after having been preheated by hot air at 95° C., was further extended in the lateral direction by 4.2 times. The extended film, as it was, was subjected to a heating treatment 1 in the tenter by hot air at 235° C., and successively subjected to a heating treatment 2 by hot air at 200° C., and after having been cooled to room temperature, the resulting film was wound up. The thickness of the resulting film was 12 μm. The resulting film was out of the range of the present invention in density as well as in heat shrinkage, and was poor in dimension stability under high temperatures as well as in moldability. The results thereof are shown in Table 7.

Comparative Example 5

By carrying out the same processes as Comparative Example 4 except that poly-2,6-naphthalene terephthalate (PEN) having an inherent viscosity of 0.62 was used as thermoplastic resin A under film-forming conditions as shown in Table 7, a film was obtained. The resulting film was out of the range of the present invention in breaking elongation, and was poor in moldability.

Comparative Example 6

By carrying out the same film-forming processes as Reference Example 2 except that the temperatures in the heat treating processes were changed to those shown in Table 7, a film was obtained. The resulting film was out of the range of the present invention in heat shrinkage, and was poor in printing processability as well as in moldability.

Example 18

Polyethylene terephthalate (PET) having a melting point Tm of 255° C., a cooling crystallization temperature Tmc of 192° C. and an inherent viscosity of 0.65, that is, F20S made by Toray Industries, was used as thermoplastic resin A. When formed into a biaxially extended film of PET simple substance by carrying out the same extending conditions and heat treatment conditions as Comparative Example 1, this resin had an α relaxation temperature of 118° C. in dynamic viscoelasticity measurements. Moreover, polybutylene terephthalate (PBT) having a melting point Tm of 223° C., a cooling crystallization temperature Tmc of 168° C. and an inherent viscosity of 1.2, that is, Trecon 1200S made by Toray Industries, was used as thermoplastic resin B. When formed into a biaxially extended film of PBT simple substance by carrying out the same extending conditions and heat treatment conditions as the present embodiment, this resin had an α relaxation temperature of 49° C. in dynamic viscoelasticity measurements. Here, this film causes a problem in which, since the PBT used in the present invention had a melting point of 223° C., the film was melted when the heating condition was set to 235° C. For this reason, the PET layers were laminated on the two surfaces of PBT so that a three-layered structure of PET/PBT/PET was used, and the α relaxation temperature was measured. These thermoplastic resins were respectively dried, and then supplied into the extruder.

Thermoplastic resins A and B were respectively formed into a molten state at 280° C. by the extruder, and allowed to pass through a gear pump and a filter, and then joined with each other through a feed block (pressure loss: 3 MPa) for 177 layers. The joined thermoplastic resins A and B were supplied to a static mixer, and divided and joined three times through square flow paths, and formed into a structure in which 705 layers of PET and 704 layers of PBT that were alternately laminated in the thickness direction, with two surface layer portions being made from PET. Here, the discharging amounts were adjusted so that the laminate layer thickness ratio (=weight ratio) was set to A/B=1. After the laminated body constituted by a total of 1409 layers thus obtained had been supplied to a T die and molded into a sheet shape, the resulting laminated body was quickly cooled and solidified on a casting drum maintained at a surface temperature of 20° C., with static electricity being applied thereto. At this time, with respect to the thickness in the width direction, the casting film was formed so that the thickness at film edge portions was set to 2.3 times the thickness in the film center portion.

The resulting cast film was preheated by a group of rollers set at 60° C. for 10 seconds, and further heated by a group of rollers set at 70° C. to be extended in the longitudinal direction by 3 times. This mono-axially extended film was directed to a tenter, and after having been preheated by hot air at 70° C., was further extended in the lateral direction by 3.2 times. The extended film, as it was, was subjected to a heating treatment in the tenter by hot air at 235° C., and successively subjected to a relaxing treatment of 5%, and after having been cooled to room temperature, the resulting film was wound up. The thickness of the resulting film was 12 μm, with 1200 or more layers, each having a thickness of less than 30 nm, being included. The resulting film had a high rigidity and was superior in dimension stability under high temperatures and transparency after the heating process, as well as in moldability in a wide temperature range. The results thereof are shown in Table 8. Here, with respect to the shape of X-ray small angle scattering, a spot-shape as shown in Table 12 was observed.

Example 19

By using the same devices and conditions as Example 18, except that the number of times in which the joined thermoplastic resins were divided and joined through the static mixer with square-shaped flow paths was set to two, a laminated film constituted by a total of 705 layers was obtained. The thickness of the laminated film was 12 μm, with 600 or more layers, each having a layer thickness of less than 30 nm, being included. The resulting film had a high rigidity and was superior in dimension stability under high temperatures and transparency after the heating process, as well as in moldability in a wide temperature range. The results thereof are shown in Table 8.

Example 20

By using the same devices and conditions as Example 18, except that the number of times in which the joined thermoplastic resins were divided and joined through the static mixer with square-shaped flow paths was set to one, a laminated film constituted by a total of 353 layers was obtained. The thickness of the laminated film was 12 μm, with 93 layers, each having a layer thickness of less than 30 nm, being included. The resulting film had a high rigidity and was superior in dimension stability under high temperatures and transparency after the heating process, as well as in moldability in a wide temperature range. The results thereof are shown in Table 8.

Example 21

By using the same devices and conditions as Example 18, a laminated film constituted by a total of 1409 layers was obtained. Here, the film thickness was set to 25 μm by adjusting the film-forming rate. This film included 1200 or more layers each of which had a layer thickness of less than 30 nm. The resulting film had a high rigidity and was superior in dimension stability under high temperatures and transparency after the heating process, as well as in moldability in a wide temperature range. The results thereof are shown in Table 9.

Example 22

By using the same devices and conditions as Example 18, a laminated film constituted by a total of 1409 layers was obtained. Here, the film thickness was set to 40 μm by adjusting the film-forming rate. This film included 1000 or more layers each of which had a layer thickness of less than 30 nm. The resulting film had a high rigidity and was superior in dimension stability under high temperatures and transparency after the heating process, as well as in moldability in a wide temperature range. The results thereof are shown in Table 9.

Example 23

By using the same devices and conditions as Example 18, a laminated film constituted by a total of 1409 layers was obtained. Here, the film thicknesses of the respective thermoplastic resins were adjusted to A:B=3:1, and the film thickness was set to 11 μm. This film included 1200 or more layers each of which had a layer thickness of less than 30 nm. The resulting film had a high rigidity and was superior in dimension stability under high temperatures and transparency after the heating process, as well as in moldability in a wide temperature range. The results thereof are shown in Table 9.

Example 24

By using the same devices and conditions as Example 18, a laminated film constituted by a total of 1409 layers was obtained. Here, the film thicknesses of the respective thermoplastic resins were adjusted to A:B=2:3, and the film thickness was set to 12 μm. This film included 1200 or more layers each of which had a layer thickness of less than 30 nm. The resulting film had a high rigidity and was superior in dimension stability under high temperatures and transparency after the heating process, as well as in moldability in a wide temperature range. The results thereof are shown in Table 10.

Example 25

By using the same devices and conditions as Example 18, a laminated film constituted by a total of 1409 layers was obtained. Here, the temperature of the heating treatment carried out after the extension process was set to 210° C. The film thickness was set to 12 μm, and this film included 1200 or more layers each of which has a layer thickness of less than 30 nm. The resulting film had a high rigidity and was superior in dimension stability under high temperatures and transparency after the heating process, as well as in moldability in a wide temperature range. The results thereof are shown in Table 10.

Example 26

By using the same devices and conditions as Example 18 except that a feed block (pressure loss: 3 MPa) for 705 layers, which had a processing precision of ±5 μm, was used, that a static mixer that satisfied the following equation in its flow path length L was used, and that the number of times in which the joined thermoplastic resins were divided and joined was set to one, a laminated film constituted by a total of 1409 layers was obtained. In this case, the square mixer satisfied the following equation: $0.7L=Q/40\sqrt{A}$ (L: flow path length [m] of static mixer, Q: amount of polymer extrusion [t/h], A: total flow path cross-section [m2]). The film thickness was set to 12 μm, and this film included 1200 or more layers each of which had a layer thickness of less than 30 nm. The resulting film had a high rigidity and was superior in dimension stability under high temperatures as well as in moldability in a wide temperature range, and was further superior in transparency after the heating process. The results thereof are shown in Table 10.

Example 27

By using the same devices and conditions as Example 26, a laminated film constituted by a total of 1409 layers was obtained. Here, the temperature of the heating treatment carried out after the extension process was set to 210° C. The film thickness was set to 12 μm, and this film included 1200 or more layers each of which had a layer thickness of less than 30 nm. The resulting film had a high rigidity and was superior in dimension stability under high temperatures as well as in moldability in a wide temperature range, and was further superior in transparency after the heating process. The results thereof are shown in Table 11.

Example 28

By using the same devices and conditions as Example 1 except that PET having a melting point Tm of 255° C., a cooling crystallization temperature Tmc of 192° C. and an inherent viscosity of 0.65, that is, F20S made by Toray Industries, was used as thermoplastic resin A and that polypropylene terephthalate (PPT) having a melting point of 229° C., made by DuPont de Nemours and Company, was used as thermoplastic resin B, a laminated film constituted by a total of 1409 layers was obtained. When formed into a biaxially extended film of PET simple substance by carrying out the same extending conditions and heat treatment conditions as Example 18, this PPT resin had an α relaxation temperature of 58° C. in dynamic viscoelasticity measurements. Here, this film causes a problem in which, since the PPT used in the present invention had a melting point of 192° C., the film was melted when the heating condition was set to 235° C. For this reason, the PET layers were laminated on the two surfaces of PPT so that a three-layered structure of PET/PPT/PET was used, and the α relaxation temperature was measured. The film thickness was set to 12 μm, and this film included 1200 or more layers each of which had a layer thickness of less than 30 nm. The resulting film had a high rigidity and was superior in dimension stability under high temperatures and transparency after the heating process, as well as in moldability in a wide temperature range. The results thereof are shown in Table 11.

Comparative Example 7

PET having a melting point Tm of 255° C., a cooling crystallization temperature Tmc of 192° C. and an inherent viscosity of 0.65, that is, F20S made by Toray Industries, was used as thermoplastic resin A. After having been dried, this thermoplastic resin A was supplied to an extruder.

Thermoplastic resin A was formed into a molten state at 280° C. by the extruder, and allowed to pass through a gear pump and a filter, and then supplied to a T die, and after having been molded into a sheet shape, the resulting laminated body was quickly cooled and solidified on a casting drum maintained at a surface temperature of 20° C., with static electricity being applied thereto.

The resulting cast film was preheated by a group of rollers set at 85° C., and further heated by a group of rollers set at 90° C. and extended in the longitudinal direction by 3.3 times. This mono-axially extended film was directed to a tenter, and after having been preheated by hot air at 100° C., was further extended in the lateral direction by 4.0 times. The extended film, as it was, was subjected to a heating treatment in the tenter by hot air at 235° C., and successively subjected to a relaxing treatment of 5%, and after having been cooled to room temperature, the resulting film was wound up. The thickness of the resulting film was 15 μm. The resulting film was poor in dimension stability under high temperatures as well as in moldability. The results thereof are shown in Table 11.

Comparative Example 8

By using the same devices and conditions as Example 18 except that a feed block (pressure loss: 1 MPa) for 41 layers was used and that no static mixer was used, a laminated film constituted by a total of 41 layers was obtained. The film thickness was set to 12 μm, and this film included no layers having a layer thickness of less than 30 nm. The resulting film was insufficient in dimension stability under high temperatures and transparency after the heating process as well as in moldability. The results thereof are shown in Table 11. Here, with respect to the shape of X-ray small angle scattering, scattering having layered lines as shown in Table 12 was observed.

TABLE 1

| | | Example 1 | Example 2 | Example 3 | Example 4 |
|---|---|---|---|---|---|
| Thermoplastic resin A | | PET | PET | PET | PET |
| Thermoplastic resin B | | PBT | PBT | PBT | PEI |
| Number of laminated layers | | 1201 | 301 | 301 | 1201 |
| Lamination ratio | (A/B) | 1 | 1 | 1 | 1 |
| Average layer thickness | | 12 nm | 20 nm | 20 nm | 12 nm |
| Lamination precision | | 20% | 18% | 66% | 40% |
| Fine crystal size | Thermoplastic resin A | 4.6 nm | 5 nm | 5.6 nm | 4.8 nm |
| | Thermoplastic resin B | 5.1 nm | 5 nm | 5.6 nm | 4.9 nm |
| Interlayer periodic structure | | Yes | Yes | Yes | Yes |
| Heating value of | Thermoplastic resin A | 24 J/g | 24 J/g | 24 J/g | 24 J/g |
| crystal fusion | Thermoplastic resin B | 18 J/g | 16 J/g | 15 J/g | 12 J/g |
| Dimension stability | (Longitudinal direction) | 0.30% | −0.20% | −0.90% | −0.20% |
| | (Width direction) | 0.00% | −0.20% | −1.00% | −0.20% |
| Yield point stress | (Longitudinal direction) | 85 MPa | 85 MPa | 85 MPa | 90 MPa |
| | (Width direction) | 85 MPa | 85 MPa | 85 MPa | 90 MPa |
| Breaking elongation | (Longitudinal direction) | 230% | 210% | 200% | 200% |
| | (Width direction) | 200% | 190% | 180% | 180% |
| Young's modulus | (Longitudinal direction) | 3.5 GPa | 3.5 GPa | 3.5 GPa | 3.8 GPa |
| | (Width direction) | 4.8 GPa | 4.8 GPa | 4.8 GPa | 4.8 GPa |

TABLE 2

| | | Example 5 | Example 6 | Example 7 |
|---|---|---|---|---|
| Thermoplastic resin A | | PET | PET | PET |
| Thermoplastic resin B | | PPT | PE · CHDM/T | PBT |
| Number of laminated layers | | 1201 | 1201 | 1201 |
| Lamination ratio | (A/B) | 1 | 1 | 1 |
| Average layer thickness | | 12 nm | 12 nm | 27 nm |
| Lamination precision | | 30% | 20% | 25% |
| Fine crystal size | Thermoplastic resin A | 4.8 nm | 4.6 nm | 4.6 nm |
| | Thermoplastic resin B | 5.0 nm | Not detected | 4.8 nm |
| Interlayer periodic structure | | Yes | No | Yes |
| Heating value of | Thermoplastic resin A | 24 J/g | 24 J/g | 24 J/g |
| crystal fusion | Thermoplastic resin B | 18 J/g | 0 J/g | 12 J/g |
| Dimension stability | (Longitudinal direction) | 0.60% | −0.80% | −0.30% |
| | (Width direction) | −0.10% | −0.90% | −0.50% |
| Yield point stress | (Longitudinal direction) | 80 MPa | 80 MPa | 90 MPa |
| | (Width direction) | 80 MPa | 80 MPa | 90 MPa |
| Breaking elongation | (Longitudinal direction) | 210% | 200% | 210% |
| | (Width direction) | 200% | 180% | 130% |
| Young's modulus | (Longitudinal direction) | 3.5 GPa | 3.0 GPa | 3.8 GPa |
| | (Width direction) | 4.8 GPa | 4.0 GPa | 4.8 GPa |

TABLE 3

| | | Example 8 | Example 9 | Example 10 | Example 11 |
|---|---|---|---|---|---|
| Thermoplastic resin A | | PET | PET | PET | PET |
| Thermoplastic resin B | | PBT | PBT | PBT | PBT |
| Number of laminated layers | | 1201 | 1201 | 1201 | 1201 |
| Lamination ratio | (A/B) | 8/2 | 4/6 | 1 | 1 |
| Average layer thickness | | 20 nm/ 5 nm | 10 nm/ 15 nm | 12 nm | 12 nm |
| Lamination precision | | 25% | 25% | 69% | 20% |
| Fine crystal size | Thermoplastic resin A | 4.6 nm | 4.5 nm | 5 nm | 3.6 nm |
| | Thermoplastic resin B | 4 nm | 5 nm | 5 nm | 4 nm |
| Interlayer periodic structure | | No | Yes | No | No |
| Heating value of crystal fusion | Thermoplastic resin A | 37 J/g | 20 J/g | 24 J/g | 24 J/g |
| | Thermoplastic resin B | 3 J/g | 21 J/g | 15 J/g | 14 J/g |
| Dimension stability | (Longitudinal direction) | −0.80% | 0.50% | −0.80% | −1.00% |
| | (Width direction) | −0.90% | 0.20% | −0.90% | −1.50% |
| Yield point stress | (Longitudinal direction) | 80 MPa | 80 MPa | 85 MPa | 85 MPa |
| | (Width direction) | 80 MPa | 80 MPa | 85 MPa | 85 MPa |
| Breaking elongation | (Longitudinal direction) | 200% | 270% | 190% | 180% |
| | (Width direction) | 100% | 180% | 180% | 110% |
| Young's modulus | (Longitudinal direction) | 3.3 GPa | 3.3 GPa | 3.5 GPa | 3.2 GPa |
| | (Width direction) | 4.7 GPa | 4.7 GPa | 4.8 GPa | 4.1 GPa |

TABLE 4

| | | Example 12 | Comparative Example 1 | Comparative Example 2 | Comparative Example 3 |
|---|---|---|---|---|---|
| Thermoplastic resin A | | PET | PET | PET | PET |
| Thermoplastic resin B | | PBT | — | PBT | PBT |
| Number of laminated layers | | 4001 | 1 | 301 | 301 |
| Lamination ratio | (A/B) | 1 | — | 1 | 1 |
| Average layer thickness | | 3 nm | — | 33 nm | 50 nm |
| Lamination precision | | 45% | — | 61% | 20% |
| Fine crystal size | Thermoplastic resin A | 4.6 nm | 5 nm | 5 nm | 5 nm |
| | Thermoplastic resin B | 4 nm | — | 5 nm | 5 nm |
| Interlayer periodic structure | | Yes | No | No | No |
| Heating value of crystal fusion | Thermoplastic resin A | 24 J/g | 43 J/g | 24 J/g | 24 J/g |
| | Thermoplastic resin B | 20 J/g | — | 12 J/g | 12 J/g |
| Dimension stability | (Longitudinal direction) | 0.10% | −1.80% | −1.50% | −1.80% |
| | (Width direction) | −0.10% | −1.50% | −1.30% | −1.50% |
| Yield point stress | (Longitudinal direction) | 75 MPa | 130 MPa | 90 MPa | 100 MPa |
| | (Width direction) | 80 MPa | 135 MPa | 95 MPa | 100 MPa |
| Breaking elongation | (Longitudinal direction) | 250% | 110% | 160% | 150% |
| | (Width direction) | 220% | 70% | 100% | 100% |
| Young's modulus | (Longitudinal direction) | 3.7 GPa | 4 GPa | 3.3 GPa | 3.3 GPa |
| | (Width direction) | 4.7 GPa | 5 GPa | 4.7 GPa | 4.7 GPa |

TABLE 5

| | | Example 13 | Example 14 | Reference Example 1 |
|---|---|---|---|---|
| Thermoplastic resin A | | PET | PET | PET |
| Thermoplastic resin B | | PBT | PBT | PBT |
| Number of laminated layers | | 1001 | 2001 | 305 |
| Lamination ratio | (A/B) | 1/1 | 1/1 | 1/1 |
| Longitudinal extension | Magnification | 3 times | 3 times | 3 times |
| | Temperature | 90° C. | 90° C. | 90° C. |
| Lateral extension | Magnification | 4.2 times | 4.2 times | 4.2 times |
| | Temperature | 95° C. | 95° C. | 95° C. |
| Heating treatment temperature 1 | | 235° C. | 235° C. | 235° C. |
| Heating treatment temperature 2 | | 200° C. | 200° C. | 200° C. |
| Film thickness | | 12 μm | 12 μm | 12 μm |
| Average layer thickness | | 12 nm | 6 nm | 40 nm |
| Density | | 1.358 g/cm$^3$ | 1.356 g/cm$^3$ | 1.359 g/cm$^3$ |
| Thermal shrinkage factor at 180° C. | (Longitudinal direction) | 0.9% | 0.9% | 1.6% |
| | (Width direction) | 2.8% | 2.7% | 2.8% |
| Breaking elongation | (Longitudinal direction) | 210% | 205% | 160% |
| | (Width direction) | 120% | 115% | 105% |
| Yield point stress | (Longitudinal direction) | 85 MPa | 80 MPa | 90 MPa |
| | (Width direction) | 90 MPa | 90 MPa | 95 MPa |
| Stress at 50% in | (Longitudinal direction) | 70 MPa | 65 MPa | 90 MPa |

TABLE 5-continued

| | | Example 13 | Example 14 | Reference Example 1 |
|---|---|---|---|---|
| elongation percentage (σ1) | (Width direction) | 120 MPa | 120 MPa | 140 MPa |
| Stress at 100% in | (Longitudinal direction) | 70 MPa | 65 MPa | 105 MPa |
| elongation percentage | (Width direction) | 140 MPa | 140 MPa | 170 MPa |
| σ2/σ1 | (Longitudinal direction) | 1 | 1 | 1.17 |
| | (Width direction) | 1.17 | 1.17 | 1.21 |
| Young's modulus | (Longitudinal direction) | 3.0 GPa | 3.0 GPa | 3.1 GPa |
| | (Width direction) | 3.8 GPa | 3.7 GPa | 3.8 GPa |
| | (Average) | 3.4 GPa | 3.4 GPa | 3.5 GPa |
| Moldability | | A | A | A |
| Print processability | | A | A | B |

TABLE 6

| | | Reference Example 2 | Example 15 | Example 16 | Example 17 |
|---|---|---|---|---|---|
| Thermoplastic resin A | | PET | PET | PET | PET |
| Thermoplastic resin B | | PBT | PEI | PBT/I | PBT |
| Number of laminated layers | | 305 | 1001 | 1001 | 1001 |
| Lamination ratio | (A/B) | 1/1 | 1/1 | 1/1 | 2/3 |
| Longitudinal extension | Magnification | 3 times | 3 times | 3 times | 3 times |
| | Temperature | 90° C. | 90° C. | 90° C. | 90° C. |
| Lateral extension | Magnification | 4.2 times | 4.2 times | 4 times | 4.2 times |
| | Temperature | 95° C. | 95° C. | 95° C. | 95° C. |
| Heating treatment temperature 1 | | 235° C. | 235° C. | 235° C. | 235° C. |
| Heating treatment temperature 2 | | 200° C. | 200° C. | 200° C. | 200° C. |
| Film thickness | | 12 μm | 12 μm | 12 μm | 12 μm |
| Average layer thickness | | 40 nm | 12 nm | 12 nm | 10 nm/14 nm |
| Density | | 1.358 g/cm$^3$ | 1.367 g/cm$^3$ | 1.345 g/cm$^3$ | 1.353 g/cm$^3$ |
| Thermal shrinkage | (Longitudinal direction) | 1.9% | 1.2% | 1.4% | −0.2% |
| factor at 180° C. | (Width direction) | 2.8% | 3.2% | 2.9% | 3.4% |
| Breaking elongation | (Longitudinal direction) | 155% | 135% | 225% | 240% |
| | (Width direction) | 105% | 70% | 140% | 130% |
| Yield point stress | (Longitudinal direction) | 95 MPa | 85 MPa | 90 MPa | 80 MPa |
| | (Width direction) | 95 MPa | 95 MPa | 85 MPa | 85 MPa |
| Stress at 50% in | (Longitudinal direction) | 95 MPa | 95 MPa | 70 MPa | 65 MPa |
| elongation percentage (σ1) | (Width direction) | 145 MPa | 160 MPa | 110 MPa | 120 MPa |
| Stress at 100% in | (Longitudinal direction) | 110 MPa | 110 MPa | 80 MPa | 65 MPa |
| elongation percentage | (Width direction) | 175 MPa | — | 130 MPa | 140 MPa |
| σ2/σ1 | (Longitudinal direction) | 1.16 | 1.16 | 1.14 | 1 |
| | (Width direction) | 1.21 | — | 1.18 | 1.17 |
| Young's modulus | (Longitudinal direction) | 3 GPa | 3.8 GPa | 3.5 GPa | 2.9 GPa |
| | (Width direction) | 3.7 GPa | 4.6 GPa | 4.1 GPa | 3.7 GPa |
| | (Average) | 3.4 GPa | 4.2 GPa | 3.8 GPa | 3.3 GPa |
| Moldability | | A | A | A | A |
| Print processability | | B | B | B | A |

TABLE 7

| | | Comparative Example 4 | Comparative Example 5 | Comparative Example 6 |
|---|---|---|---|---|
| Thermoplastic resin A | | PET | PEN | PET |
| Thermoplastic resin B | | — | — | PBT |
| Number of laminated layers | | 1 | 1 | 305 |
| Lamination ratio | (A/B) | — | — | 1/1 |
| Longitudinal extension | Magnification | 3 times | 5 times | 3 times |
| | Temperature | 90° C. | 135° C. | 90° C. |
| Lateral extension | Magnification | 4.2 times | 4.5 times | 4.2 times |
| | Temperature | 95° C. | 135° C. | 95° C. |
| Heating treatment temperature 1 | | 235° C. | 240° C. | 235° C. |
| Heating treatment temperature 2 | | 200° C. | 205° C. | 235° C. |
| Film thickness | | 12 μm | 12 μm | 12 μm |
| Average layer thickness | | — | — | 40 nm |
| Density | | 1.401 g/cm$^3$ | 1.357 g/cm$^3$ | 1.368 g/cm$^3$ |
| Thermal shrinkage | (Longitudinal direction) | 2.8% | 1.8% | 2.5% |
| factor at 180° C. | (Width direction) | 3.3% | 2.2% | 3.2% |
| Breaking elongation | (Longitudinal direction) | 160% | 85% | 140% |
| | (Width direction) | 110% | 80% | 100% |

TABLE 7-continued

| | | Comparative Example 4 | Comparative Example 5 | Comparative Example 6 |
|---|---|---|---|---|
| Yield point stress | (Longitudinal direction) | 120 MPa | 160 MPa | 105 MPa |
| | (Width direction) | 125 MPa | 175 MPa | 115 MPa |
| Stress at 50% in elongation percentage (σ1) | (Longitudinal direction) | 130 MPa | 180 MPa | 100 MPa |
| | (Width direction) | 235 MPa | 340 MPa | 155 MPa |
| Stress at 100% in elongation percentage | (Longitudinal direction) | 155 MPa | — | 120 MPa |
| | (Width direction) | 300 MPa | — | 190 MPa |
| σ2/σ1 | (Longitudinal direction) | 1.24 | — | 1.2 |
| | (Width direction) | 1.28 | — | 1.23 |
| Young's modulus | (Longitudinal direction) | 3.8 GPa | 6.9 GPa | 3 GPa |
| | (Width direction) | 4.8 GPa | 7 GPa | 3.7 GPa |
| | (Average) | 4.3 GPa | 7 GPa | 3.4 GPa |
| Moldability | | B | C | B |
| Print processability | | C | C | C |

TABLE 8

| | | Example 18 | Example 19 | Example 20 |
|---|---|---|---|---|
| Number of layers | | 1409 | 705 | 353 |
| Number of layers of feed block | | 177 | 177 | 177 |
| Number of times of divisions and combines by static mixer | | 3 | 2 | 1 |
| Thermoplastic resin A | | PET | PET | PET |
| Thermoplastic resin B | | PBT | PBT | PBT |
| Lamination ratio A:B | | 1:1 | 1:1 | 1:1 |
| Average layer thickness A/B (nm) | | 9/9 | 17/17 | 33/33 |
| Longitudinal extension | Temperature (° C.) | 70 | 70 | 70 |
| | Magnification | 3 | 3 | 3 |
| Lateral extension | Temperature (° C.) | 70 | 70 | 70 |
| | Magnification | 3.2 | 3.2 | 3.2 |
| Heating treatment temperature | (° C.) | 235 | 235 | 235 |
| Thickness | (μm) | 12 | 12 | 12 |
| α relaxation temperature | (° C.) | 97 | 95 | 98 |
| Melting point Tm | (° C.) | 223 | 223 | 223 |
| | | 254 | 254 | 254 |
| Thermal expansion coefficient (ppm) | Longitudinal direction | 88 | 89 | 89 |
| | Width direction | 88 | 89 | 90 |
| Raised haze value | (%) | 13.0 | 13.0 | 14.5 |
| Shape of X-ray small angle scattering | | Spot shape | Spot shape | Spot shape |
| Breaking elongation (%) | Longitudinal direction | 210 | 200 | 190 |
| | Width direction | 220 | 180 | 130 |
| Vacuum molding test | | A | A | B |
| Density (g/cm3) | | 1.360 | 1.360 | 1.361 |
| Thermal shrinkage factor at 180° C. (%) | Longitudinal direction | 1.5 | 1.5 | 1.7 |
| | Width direction | 1.5 | 1.5 | 1.7 |
| Yield point stress (MPa) | Longitudinal direction | 88 | 88 | 88 |
| | Width direction | 85 | 86 | 85 |
| Stress at 50% in elongation percentage (σ1) | Longitudinal direction | 80 | 80 | 80 |
| | Width direction | 75 | 75 | 75 |
| Stress at 100% in elongation percentage (σ2) | Longitudinal direction | 88 | 88 | 88 |
| | Width direction | 85 | 85 | 85 |
| Young's modulus (Mpa) | Longitudinal direction | 3.6 | 3.6 | 3.6 |
| | Width direction | 3.5 | 3.5 | 3.5 |
| | Average | 3.6 | 3.6 | 3.6 |

TABLE 9

| | Example 21 | Example 22 | Example 23 |
|---|---|---|---|
| Number of layers | 1409 | 1409 | 1409 |
| Number of layers of feed block | 177 | 177 | 177 |
| Number of times of divisions and combines by static mixer | 3 | 3 | 3 |
| Thermoplastic resin A | PET | PET | PET |
| Thermoplastic resin B | PBT | PBT | PBT |
| Lamination ratio A:B | 1:1 | 1:1 | 3:1 |
| Average layer thickness A/B (nm) | 18/18 | 28/28 | 12/4 |

TABLE 9-continued

| | | Example 21 | Example 22 | Example 23 |
|---|---|---|---|---|
| Longitudinal extension | Temperature (° C.) | 70 | 70 | 70 |
| | Magnification | 3 | 3 | 3 |
| Lateral extension | Temperature (° C.) | 70 | 70 | 70 |
| | Magnification | 3.2 | 3.2 | 3.2 |
| Heating treatment temperature | (° C.) | 235 | 235 | 235 |
| Thickness | (μm) | 25 | 40 | 12 |
| α relaxation temperature | (° C.) | 97 | 96 | 107 |
| Melting point Tm | (° C.) | 223 | 223 | 223 |
| | | 254 | 254 | 254 |
| Thermal expansion | Longitudinal direction | 88 | 88 | 55 |
| coefficient (ppm) | Width direction | 88 | 88 | 56 |
| Raised haze value | (%) | 12.0 | 11.5 | 12.0 |
| Shape of X-ray small angle scattering | | Spot shape | Spot shape | Spot shape |
| Breaking elongation | Longitudinal direction | 230 | 220 | 190 |
| (%) | Width direction | 230 | 225 | 200 |
| Vacuum molding test | | A | A | A |
| Density (g/cm3) | | 1.361 | 1.361 | 1.368 |
| Thermal shrinkage | Longitudinal direction | 1.4 | 1.4 | 2.0 |
| factor at 180° C. (%) | Width direction | 1.4 | 1.4 | 0.5 |
| Yield point stress | Longitudinal direction | 90 | 90 | 100 |
| (MPa) | Width direction | 86 | 86 | 90 |
| Stress at 50% in | Longitudinal direction | 80 | 80 | 110 |
| elongation percentage (σ1) | Width direction | 85 | 85 | 110 |
| Stress at 100% in | Longitudinal direction | 88 | 88 | 125 |
| elongation percentage (σ2) | Width direction | 95 | 95 | 130 |
| Young's modulus | Longitudinal direction | 3.6 | 3.6 | 4.0 |
| (Mpa) | Width direction | 3.7 | 3.7 | 4.1 |
| | Average | 3.7 | 3.7 | 4.1 |

TABLE 10

| | | Example 24 | Example 25 | Example 26 |
|---|---|---|---|---|
| Number of layers | | 1409 | 1409 | 1409 |
| Number of layers of feed block | | 177 | 177 | 705 |
| Number of times of divisions and combines by static mixer | | 3 | 3 | 1 |
| Thermoplastic resin A | | PET | PET | PET |
| Thermoplastic resin B | | PBT | PBT | PBT |
| Lamination ratio A:B | | 2:3 | 1:1 | 1:1 |
| Average layer thickness A/B (nm) | | 7/10 | 9/9 | 9/9 |
| Longitudinal extension | Temperature (° C.) | 70 | 70 | 70 |
| | Magnification | 3 | 3 | 3 |
| Lateral extension | Temperature(° C.) | 70 | 70 | 70 |
| | Magnification | 3.2 | 3.2 | 3.2 |
| Heating treatment temperature | (° C.) | 235 | 210 | 235 |
| Thickness | (μm) | 12 | 12 | 12 |
| α relaxation temperature | (° C.) | 84 | 97 | 97 |
| Melting point Tm | (° C.) | 223 | 233 | 223 |
| | | 254 | 254 | 254 |
| Thermal expansion | Longitudinal direction | 95 | 84 | 86 |
| coefficient (ppm) | Width direction | 96 | 85 | 86 |
| Raised haze value | (%) | 14.0 | 3.0 | 4.9 |
| Shape of X-ray small angle scattering | | Spot shape | Spot shape | Spot shape |
| Breaking elongation | Longitudinal direction | 200 | 190 | 220 |
| (%) | Width direction | 205 | 180 | 220 |
| Vacuum molding test | | A | A | A |
| Density (g/cm3) | | 1.358 | 1.350 | 1.360 |
| Thermal shrinkage | Longitudinal direction | 0.5 | 1.9 | 1.5 |
| factor at 180° C. (%) | Width direction | 2.5 | 2.5 | 1.5 |
| Yield point stress | Longitudinal direction | 86 | 78 | 88 |
| (MPa) | Width direction | 84 | 78 | 85 |
| Stress at 50% in | Longitudinal direction | 75 | 85 | 80 |
| elongation percentage (σ1) | Width direction | 90 | 90 | 75 |
| Stress at 100% in | Longitudinal direction | 75 | 100 | 88 |
| elongation percentage (σ2) | Width direction | 105 | 110 | 85 |

TABLE 10-continued

| | | Example 24 | Example 25 | Example 26 |
|---|---|---|---|---|
| Young's modulus (Mpa) | Longitudinal direction | 3.6 | 3.3 | 3.6 |
| | Width direction | 3.4 | 3.4 | 3.5 |
| | Average | 3.5 | 3.4 | 3.6 |

TABLE 11

| | | Example 27 | Example 28 | Comparative Example 7 | Comparative Example 8 |
|---|---|---|---|---|---|
| Number of layers | | 1409 | 1409 | — | 41 |
| Number of layers of feed block | | 705 | 177 | — | 41 |
| Number of times of divisions and combines by static mixer | | 1 | 3 | — | — |
| Thermoplastic resin A | | PET | PET | PET | PET |
| Thermoplastic resin B | | PBT | PPT | — | PBT |
| Lamination ratio A:B | | 1:1 | 1:1 | — | 1:1 |
| Average layer thickness A/B (nm) | | 9/9 | 9/9 | — | 291/291 |
| Longitudinal extension | Temperature (° C.) | 70 | 70 | 90 | 70 |
| | Magnification | 3 | 3 | 3.3 | 3 |
| Lateral extension | Temperature (° C.) | 70 | 70 | 100 | 70 |
| | Magnification | 3.2 | 3:2 | 4 | 3.2 |
| Heating treatment temperature | (° C.) | 210 | 235 | 235 | 235 |
| Thickness | (μm) | 12 | 12 | 12 | 12 |
| α relaxation temperature | (° C.) | 97 | 103 | 119 | 110<br>54 |
| Melting point Tm | (° C.) | 223<br>254 | 223<br>253 | 255 | 222<br>254 |
| Thermal expansion coefficient (ppm) | Longitudinal direction | 83 | 60 | 30 | 120 |
| | Width direction | 84 | 63 | 35 | 119 |
| Raised haze value | (%) | 1.5 | 10.0 | 0.5 | 18.0 |
| Shape of X-ray small angle scattering | | Spot shape | Spot shape | Layer line shape | Layer line shape |
| Breaking elongation (%) | Longitudinal direction | 200 | 190 | 175 | 170 |
| | Width direction | 205 | 150 | 120 | 115 |
| Vacuum molding test | | A | A | C | C |
| Density (g/cm3) | | 1.350 | 1.358 | 1.401 | 1.362 |
| Thermal shrinkage factor at 180° C. (%) | Longitudinal direction | 2.0 | 1.0 | 2.8 | 2.7 |
| | Width direction | 2.5 | 1.5 | 2.8 | 3.5 |
| Yield point stress (MPa) | Longitudinal direction | 78 | 82 | 120 | 110 |
| | Width direction | 78 | 82 | 125 | 110 |
| Stress at 50% in elongation percentage (σ1) | Longitudinal direction | 85 | 110 | 120 | 120 |
| | Width direction | 85 | 130 | 235 | 125 |
| Stress at 100% in elongation percentage (σ2) | Longitudinal direction | 100 | 120 | 155 | 160 |
| | Width direction | 110 | 155 | 300 | 160 |
| Young's modulus (Mpa) | Longitudinal direction | 3.3 | 3.8 | 3.8 | 3.7 |
| | Width direction | 3.4 | 4.2 | 4.8 | 3.7 |
| | Average | 3.4 | 4.0 | 4.3 | 3.7 |

INDUSTRIAL APPLICABILITY

In accordance with the present invention, a film that has a high rigidity and is superior in dimension stability under high temperatures and in moldability can be obtained.

Moreover, the resulting film is also superior in transparency after heating processes.

By controlling the thermal expansion coefficient of the film, it becomes possible to provide a molding process that is superior in dimension stability under high temperatures and can be carried out with high precision even under high temperature.

Moreover, by controlling the raised haze value after heating tests, it becomes possible to obtain a film that is superior in transparency after heating processes and has a superior glossy appearance when used as a molded body.

Therefore, the present invention makes it possible to provide a laminated film or a biaxial oriented polyester film that has superior high-temperature resistant dimension stability and is superior in moldability, and the resulting film is desirably applied to a molded body, transfer foil, an outer jacketing member for a lithium ion battery and the like.

The invention claimed is:

1. A laminated film comprising: 50 or more layers, the layers being adjacent to each other with each layer being made of a thermoplastic resin and each layer having a thickness of less than 15 nm.

2. The laminated film according to claim 1, which is made from at least two kinds of thermoplastic resins.

3. The laminated film according to claim 1, which is a biaxially extended film.

4. A laminated film according to claim 1, which is biaxially oriented and has a density in a range from 1 to 1.4 g/cm$^3$, a heat shrinkage of −2 to 2% in the longitudinal direction at 180° C. and a breaking elongation in a range of 100 to 1000% in at least one direction.

5. The laminated film according to claim 1, which is made from at least two kinds of crystalline resins having different crystal structures.

6. The laminated film according to claim 1, wherein a periodic structure is contained in the layers.

7. The laminated film according to claim 1, wherein the thickness of each layer is set to 0.1 to 8 times the crystal size of the resin forming the layer.

8. The laminated film according to claim 1, characterized in that two or more endothermic peaks of crystal fusion, which are measured as 8 J/g or more, are observed by differential scanning calorimetry measurements carried out on the film.

9. The laminated film according to claim 1, wherein the number of laminated layers is 1000 or more and the precision of lamination is 50% or less.

10. The laminated film according to claim 1, wherein the elongation percentage to stress characteristic at room temperature at least in one direction satisfies the following expression (1):

$$0.9 \leqq \sigma 2/\sigma 1 \leqq 1.2 \quad \text{expression (1)}$$

σ1: stress at 50% in elongation percentage (MPa)

σ2: stress at 100% in elongation percentage (MPa)

11. The laminated film according to claim 1, wherein the elongation percentage to stress characteristic at room temperature at least in one direction satisfies the following expressions (2) to (4):

$$\sigma 1 \leqq 120 \quad \text{expression (2)}$$

$$\sigma 2 \leqq 140 \quad \text{expression (3)}$$

$$\sigma 3 \leqq 110 \quad \text{expression (4)}$$

σ1: stress at 50% in elongation percentage (MPa)

σ2: stress at 100% in elongation percentage (MPa)

σ3: yield point stress (MPa)

12. The laminated film according to claim 1, wherein the average Young's modulus in the film longitudinal direction as well as in the film width direction is set in a range from 3 to 5 GPa.

13. The laminated film according to claim 1, further comprising:

50 or more layers formed by layers made from a thermoplastic resin A and layers made from a thermoplastic resin B, wherein an α relaxation temperature, obtained in dynamic viscoelasticity measurements, is observed between (α relaxation temperature of thermoplastic resin B+10)° C. and (α relaxation temperature of thermoplastic resin A−10)° C., with two or more melting points.

14. The laminated film according to claim 1, wherein the thermal expansion coefficient is set to 110 ppm or less.

15. The laminated film according to claim 1, wherein a raised haze value after a heating test is set to 15% or less.

16. The laminated film according to claim 1, wherein, upon measurements on X-ray small angle scattering, spot-shaped scattering is observed in the end direction and/or the edge direction.

17. The laminated film according to claim 1, wherein a difference (ΔTm) between the melting point and the cooling crystallization temperature of thermoplastic resin A and/or thermoplastic resin B is set to 60° C. or less.

18. The laminated film according to claim 1, wherein: a raised haze value after a heating test is set to 5% or less; the laminated film includes 500 or more layers formed by layers made from thermoplastic resin A and layers made from thermoplastic resin B; an α relaxation temperature, obtained in dynamic viscoelasticity measurements, is observed between (α relaxation temperature of thermoplastic resin B+10)° C. and (α relaxation temperature of thermoplastic resin A−10)° C.; and the elongation percentage to stress characteristic at room temperature at least in one direction satisfies the following expression (1):

$$0.9 \leqq \sigma 2/\sigma 1 \leqq 1.2 \quad \text{expression (1)}$$

σ1: stress at 50% in elongation percentage (MPa)

σ2: stress at 100% in elongation percentage (MPa)

19. The laminated film according to claim 1, wherein the film thickness is set to 1 μm or more to 600 μm or less.

20. A molded body which is formed by using the laminated film according to claim 1.

21. A transferring foil which is formed by using the laminated film according to claim 1.

22. A lithium ion battery outer jacketing member which is formed by using the laminated film according to claim 1.

* * * * *